US008237950B2

(12) United States Patent
Konno

(10) Patent No.: US 8,237,950 B2
(45) Date of Patent: Aug. 7, 2012

(54) IMAGE FORMATION DEVICE AND PROCESSING METHOD THEREOF

(75) Inventor: Shigeki Konno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1242 days.

(21) Appl. No.: 10/985,753

(22) Filed: Nov. 10, 2004

(65) Prior Publication Data

US 2005/0105128 A1 May 19, 2005

(30) Foreign Application Priority Data

Nov. 18, 2003 (JP) ................................. 2003-388468

(51) Int. Cl.
*G06F 3/12* (2006.01)
*G06K 15/00* (2006.01)
(52) U.S. Cl. ...................................... 358/1.15; 358/1.16
(58) Field of Classification Search ......................... None
See application file for complete search history.

(56) References Cited

U.S. PATENT DOCUMENTS

| 5,287,194 A * | 2/1994 | Lobiondo | 358/296 |
| 5,717,501 A * | 2/1998 | Iwamoto et al. | 358/468 |
| 5,768,516 A * | 6/1998 | Sugishima | 709/217 |
| 6,609,162 B1 | 8/2003 | Shimizu | |
| 6,859,290 B2 * | 2/2005 | Mishima et al. | 358/1.6 |
| 2002/0116439 A1 * | 8/2002 | Someshwar et al. | 709/104 |

FOREIGN PATENT DOCUMENTS

| JP | 08-297549 A | 11/1996 |
| JP | 2000-322223 A | 11/2000 |
| JP | 2001-026169 A | 1/2001 |
| JP | 2002-010004 A | 1/2002 |
| JP | 2003-131824 A | 5/2003 |

* cited by examiner

*Primary Examiner* — Twyler Haskins
*Assistant Examiner* — Marcus T Riley
(74) *Attorney, Agent, or Firm* — Canon U.S.A., Inc. IP Division

(57) ABSTRACT

An image formation device, having a storage unit capable of storing image data, includes a determination unit for determining the capability of another image formation device, and an editing unit for performing desired editing as to the image data to be stored in the storage unit. If the determination unit determines that the desired editing cannot be performed by another image formation device, the desired editing is performed by the editing unit and the image data subjected to the desired editing by the editing unit is transmitted to another image formation device. On the other hand, if the determination unit determines that the desired editing can be performed with another image formation device, the image data is transmitted to another image formation device without the editing unit performing the desired editing.

8 Claims, 14 Drawing Sheets

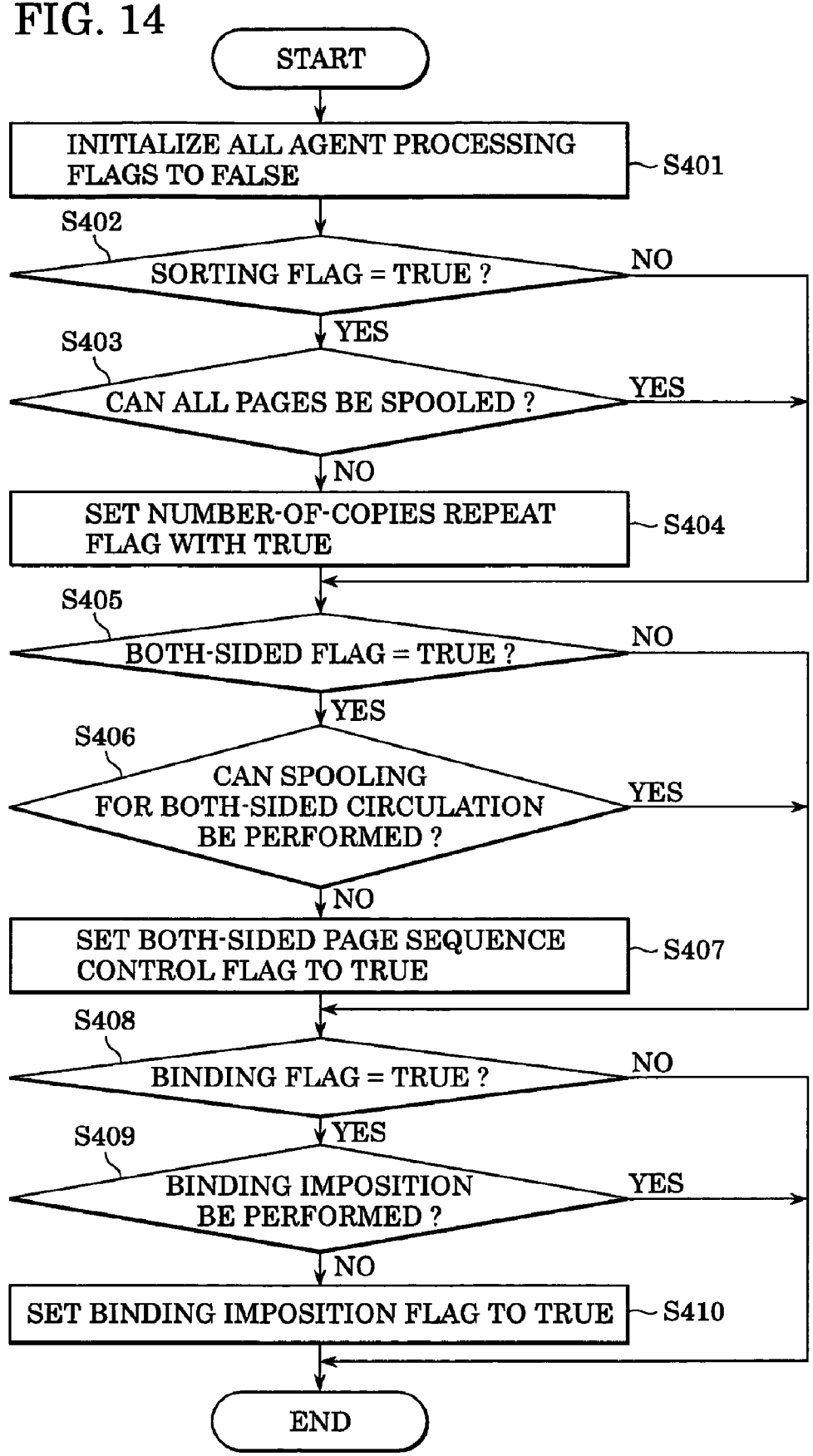

IMAGE FORMATION DEVICE AND PROCESSING METHOD THEREOF

BACKGROUND OF THE INVENTION

1. Field of the Invention

The present invention relates to an image formation device and a processing method thereof, and more specifically relates to an image formation device according to a digital multi-function printer including multiple peripheral equipment functions such as copying, scanning, PDL printing, and the like, and a processing method of the image formation device.

2. Description of the Related Art

In recent years, image formation devices such as digital multi-function printers, PDL (Page Description Language) printers, and the like, which include a network connection function, have been widely employed with the increasingly widespread use of networks. New functions have been enabled by mutually connecting these image formation devices through networks and working in collaboration with each other.

Examples of new functions include a remote copy function for printing an image read at a certain device by using another printer connected to a network, a multi-copy function for printing an image read at a certain scanner by using multiple printers, and a PDL clustering printing function for printing PDL data received at a certain printer by using multiple printers.

Some literature has disclosed the technical content relating to the conventional technique as described above. For example, Japanese Patent Laid-Open No. 2000-187573 discloses a technique for having a user confirm available functions with a combination of a scanner and printer by displaying only executable functions on an operating panel of the scanner side as an operating key. There is a need for determining processing capabilities of these remote devices so that a determination can be made as to appropriate image formation device(s) for performing a particular job.

SUMMARY OF THE INVENTION

According to an aspect of the present invention, an image formation device including storage means capable of storing image data includes: editing means for performing desired editing as to the image data stored in the storage means; and determination means for deciding the performance of another image formation device. If it is determined that the desired editing cannot be performed with another image formation device, image data subjected to the desired editing by the editing means is sent to another image formation device. On the other hand, if it is determined that the desired editing can be performed with another image formation device, the image data is sent to another image formation device without the editing means performing the desired editing.

According to another aspect of the present invention, an image formation device including storage means capable of storing image data includes: determination means for determining capability of another image formation device; page-sequence change means for changing the page sequence of image data to be transmitted to another image formation device; and transmission means for transmitting image data to another image formation device in the page sequence changed by the page-sequence change means when the determination means determines that the storage means of the another image formation device does not have sufficient storage capacity.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 14 is a flowchart illustrating in further detail the processing of Step S203 of FIG. 13 according to the embodiment of the present invention in detail.

DESCRIPTION OF THE EMBODIMENTS

Figure 1:
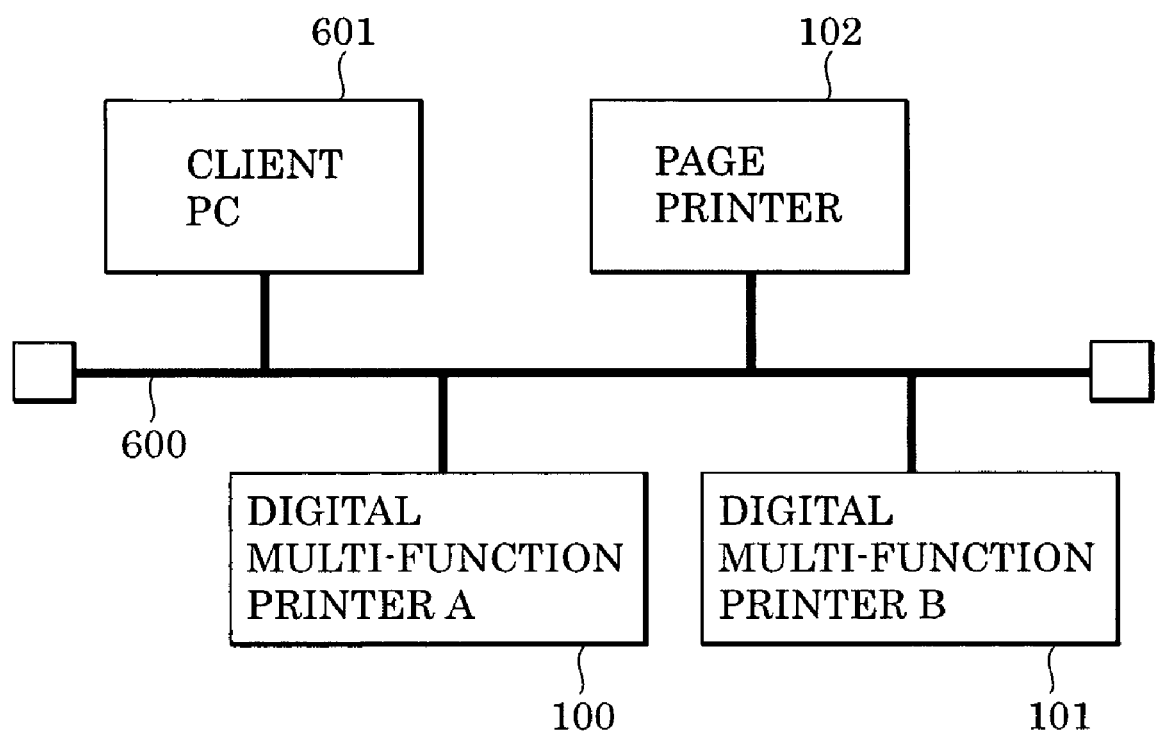
FIG. 1 is a configuration example of a communication network connected with digital multi-function printers according to an embodiment of the present invention.

An embodiment of the present invention is described in detail below with reference to the drawings. Note that components having the same function are denoted with the same reference numerals in the drawings, and description thereof will not be repeated.

Configuration of Device

FIG. 1 is an exemplary configuration of a communication network connected with digital multi-function printers according to an embodiment of the present invention. In FIG.

1, a digital multi-function printer A 100, a digital multi-function printer B 101 (equivalent to the digital multi-function printer A 100), a page printer 102 serving as a print-dedicated machine, a client PC (Personal Computer) 601 for inputting a PDL print job and the like to the digital multi-function printers and page printer are connected via a network, such as a LAN (Local Area Network) 600 (e.g., Ethernet). Note that with the present embodiment, the communication medium is not restricted to a LAN, and that an arrangement may be made in which a PC (Personal Computer) and a peripheral device, or peripheral devices one with another, are connected directly by USB (Universal Serial Bus) or the like.

With the above-described configuration, the digital multi-function printers and page printer mutually communicate, work in collaboration with each other, and provide functions such as the following.

(1) Remote Copy Function: A document image is read by a scanner of the digital multi-function printer A 100, and the image data generated by the scanner is printed by a printer of the digital multi-function printer B 101 or the page printer 102.
(2) Multi-copy Function: A document image is read by the scanner of the digital multi-function printer A 100, and the image data generated by the scanner is distributed to and printed by the printer of the digital multi-function printer A 100, the digital multi-function printer B 101, and the page printer 102.
(3) PDL Clustering Print Function: The digital multi-function printer A 100 receives PDL data from the client PC 601, and the image data generated is distributed to and printed by the printer of the digital multi-function printer A 100, the printer of the digital multi-function-printer B 101, and the page printer 102.
(4) Substitution Print Function: In the event that the digital multi-function printer A 100 reads a document image or receives PDL data from the client PC 601 to generate image data, and attempts to print the generated image data on the printer of the digital multi-function printer A 100, but printing cannot be performed due to lack of printing sheets or a printer failure, the digital multi-function printer A 100 transfers the image data to either the digital multi-function printer B 101 or page printer 102 for printing.

Figure 2:
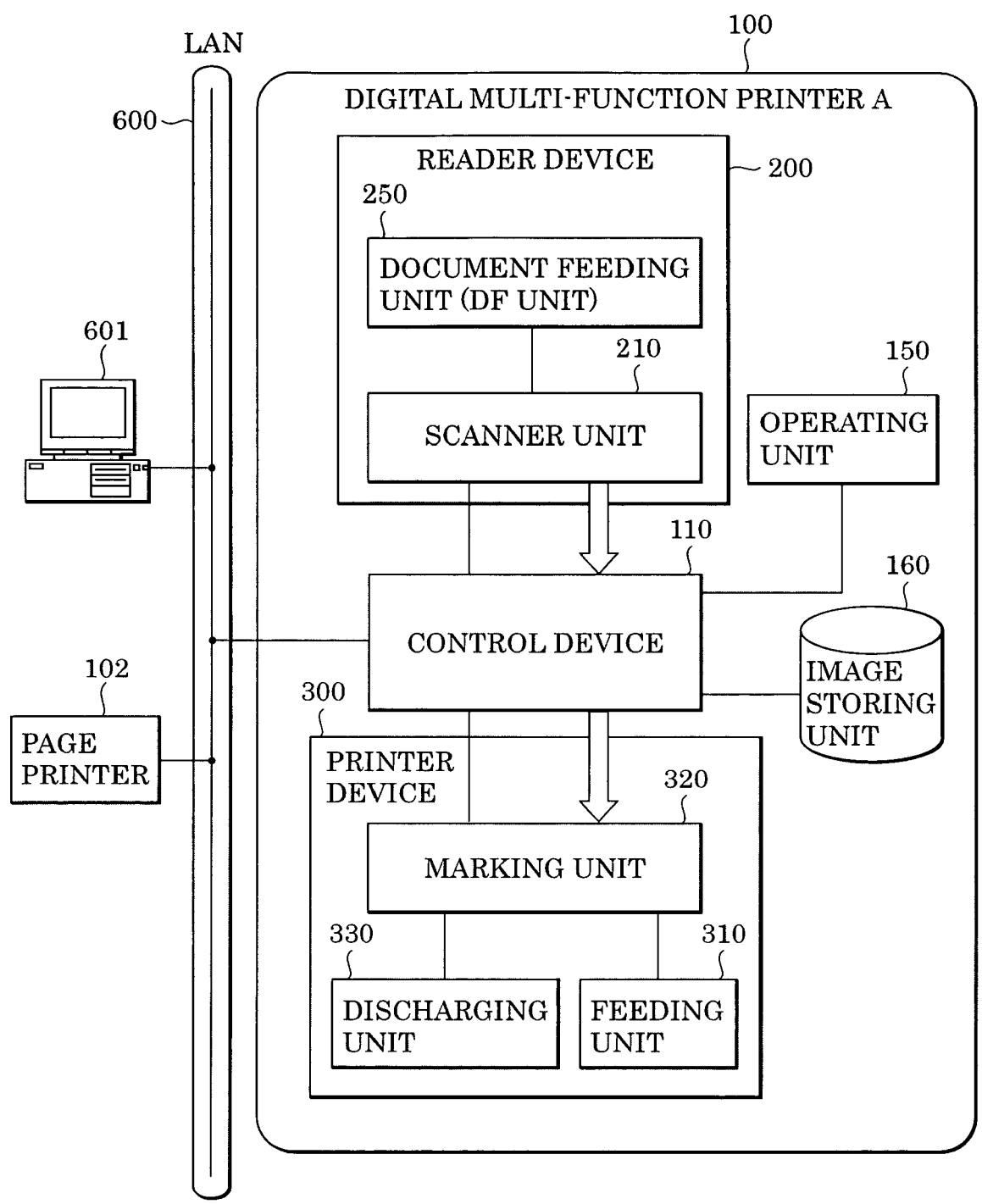
FIG. 2 is a block diagram illustrating the basic configuration of a digital multi-function printer according to the embodiment of the present invention.

FIG. 2 is a block diagram illustrating the basic configuration of the digital multi-function printer A 100 shown in FIG. 1. Note that the configuration of the digital multi-function printer B 101 is the same configuration, and the configuration of the page printer 102 is the same as the block diagram except for a reader device 200 and image storing unit 160. The digital multi-function printer A 100 comprises the reader device 200 for reading a document image to generate image data, a printer device 300 for recording the image data on a printing sheet, an operating unit 150 including a liquid crystal panel for displaying the image data or displaying/setting various kinds of functions in accordance with the operations of an operator, a keyboard, the image storing unit 160 for storing the image data read by controlling the reader device 200, or the image data generated from code data (PDL data or compressed image data) received from the client PC 601 or digital multi-function printer B 101 via the LAN 600, and a control device 110.

The reader device 200 includes a document feeding unit 250 for transporting document sheets, and a scanner unit 210 for reading a document image optically to convert this into image data as an electric signal. The printer device 300 includes a feeding unit 310 including multi-stepped feeding cassettes for accommodating recording sheets, a marking unit 320 for transferring and fixing image data onto a recording sheet, and a discharging unit 330 for subjecting the recording sheets printed to sorting or stapling processing, and discharging these outside the printer.

The control device 110 includes a network interface for performing communication via the LAN 600, a communication function for performing various kinds of network protocols, and a code data rendering function for converting code data (PDL data or compressed image data) received from the client PC 601 or digital multi-function printer 101 through the communication function into image data, and realizes, by controlling these functions and the above-described configuration components, a copy function, PDL (code data) print function, remote/multi-copy function, PDL clustering print function, and substitution print function.

Figure 3:
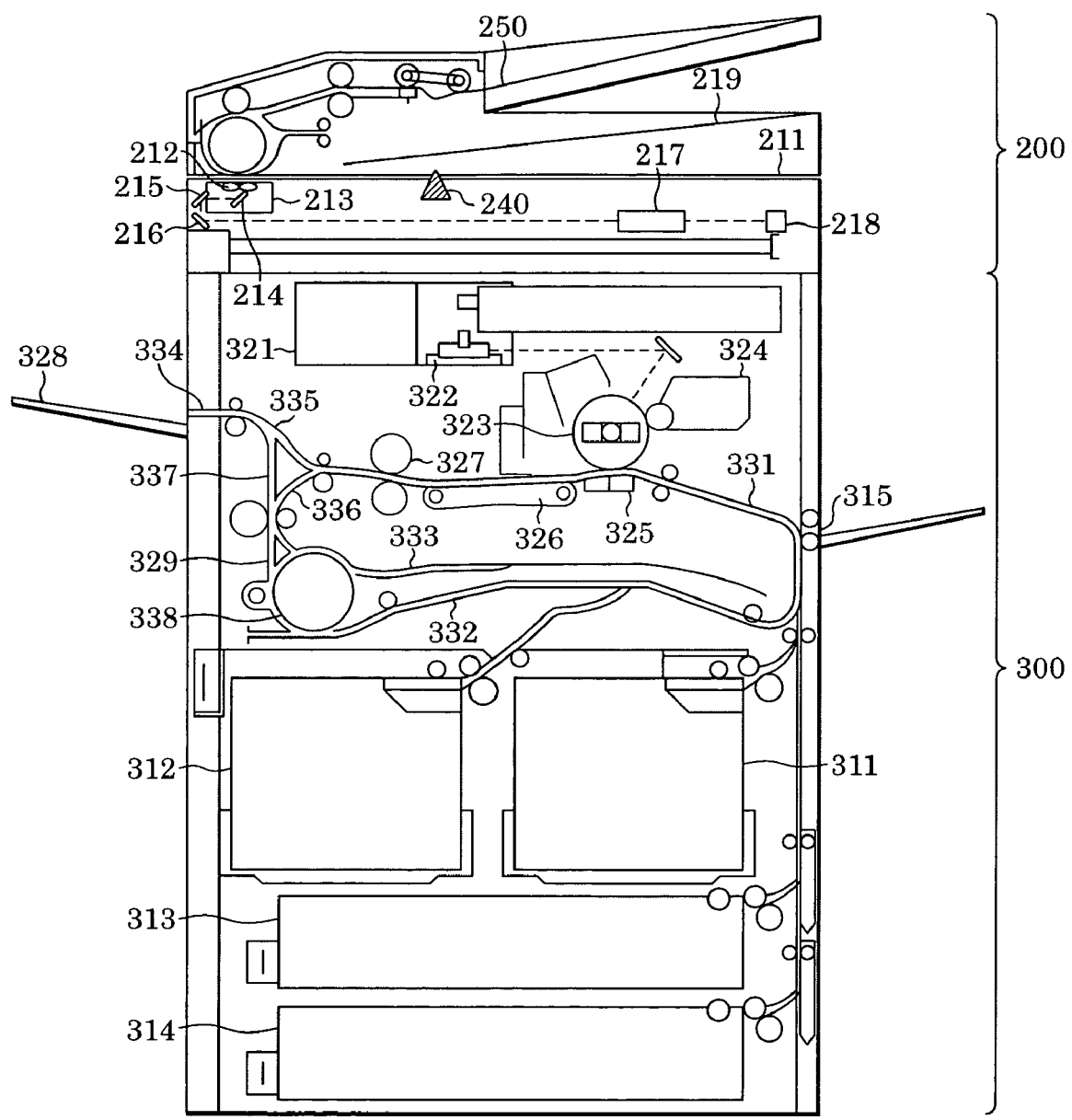
FIG. 3 is a cross-sectional view illustrating details of a reader device and printer device according to the embodiment of the present invention.

FIG. 3 is a cross-sectional view illustrating the details of the reader device 200 and printer device 300. The reader device 200 feeds a document sheet from the top of document sheets loaded in the document feeding unit 250 onto platen glass 211 in the loaded order one by one, and discharges the sheet to a discharging tray 219 following a predetermined read operation being completed at the scanner unit 210. During the read operation, the scanner unit 210 turns on a lamp 212 when a document sheet is transported on the platen glass 211, controls an optical unit 213 to move, and irradiates and scans the document sheet from under of the document sheet. Reflected light from the document sheet is guided to a CCD (charge-coupled device) image sensor (hereinafter, referred to as "CCD") 218 via multiple mirrors 214 through 216 and a lens 217, and the document image scanned is read by the CCD 218. The image data read by the CCD 218 is subjected to predetermined processing, and then transferred to the control device 110.

In the event that the document feeding unit 250 includes a skim-through function, the document sheets loaded in the document feeding unit 250 are passed through a document skim-through position 240 at a constant speed. In this case, the optical unit 213 irradiates a document sheet, which is moved to the document skim-through position 240 and transported at a constant speed, by using the lamp 212. Image data is generated by reading the reflected light through the CCD 218 as necessary, subjected to predetermined processing, and then transferred to the control device 110.

The printer device 300 outputs a laser beam, which corresponds to the image data output from the control device 110, from a laser emission unit 322 driven by a laser driver 321. An electrostatic latent image corresponding to the laser beam is formed on a photosensitive drum 323, and a developing agent is adhered to the portion of the electrostatic latent image by means of a developing apparatus 324.

On the other hand, a recording sheet is fed from any one of cassettes 311 through 314, and a manual feeder 315 at the timing of synchronizing with the start of irradiation of the laser beam, and transported to a transfer unit 325 via a transporting path 331. The developing agent adhered to the photosensitive drum 323 at the transfer unit 325 is transferred onto the recording sheet. The recording sheet on which the image data is transferred is transported to a fixing unit 327 through a transporting belt 326, and the image data is fixed onto the recording sheet by heat and pressure processing at the fixing unit 327. The recording sheet subjected to the fixing processing is discharged to a discharge bin 328 via transporting paths 335 and 334. In the event that the printing surface of the recording sheet is reversed and discharged to the discharge bin 328, the recording sheet is guided to the transporting paths 336 and 338, and the recording sheet is transported in the inverse direction, and discharged to the discharge bin 328 via the transporting paths 337 and 334.

Though not shown in the drawing, an arrangement may be made in which a discharge unit that can staple recording sheets discharged in a bundle, or prepare a pamphlet by stapling the bundle of the recording sheets while bending them at the center thereof is provided instead of the discharge bin.

In the event that the image data is recorded on both sides of the recording sheet, the recording sheet passed through the fixing unit 327 is guided to a transporting path 333 from the transporting path 336 via a flapper 329, then transported in the inverse direction, and guided to the transporting path 338 and re-feeding transporting path 332 via the flapper 329. When the recording sheet guided to the re-feeding transporting path 332 is subjected to transfer and fixing processing again, the recording sheet is transported to the transfer unit 325 via the transporting path 331. The same processing as described above is then performed.

In the event of performing both-sided recording on one recording sheet, the following processing is performed by using the above-described transporting paths in the order of:
(1) Feeding from a feeding cassette
(2) Transfer and fixing on the front side
(3) Re-feeding from the re-feeding transporting path
(4) Transfer and fixing on the back side However, in the event of performing both-sided recording on multiple recording sheets consecutively, the recording sheets on only one side of which the image data is transferred and fixed are loaded in the transporting path 333 and the re-feeding transporting path 332 as much as possible, and the intervals between the recording sheets within the transporting paths are narrowed for better printing productivity. For example, the following processing is performed in the following order (front, front, back, front, back, front, back, . . . , back).
(1) Feeding from a feeding cassette
(2) Transfer and fixing on the front side
(3) Feeding from a feeding cassette
(4) Transfer and fixing on the front side
(5) Re-feeding from the re-feeding transporting path
(6) Transfer and fixing on the back side
(7) Hereinafter, feeding, transfer and fixing on the front side, re-feeding, transfer and fixing on the back side are repeated
(8) Finally, re-feeding, transfer and fixing on the back side Consequently, the image data is output from the control device 110 in the appropriate order corresponding to this transfer and fixing order.

Figure 4:
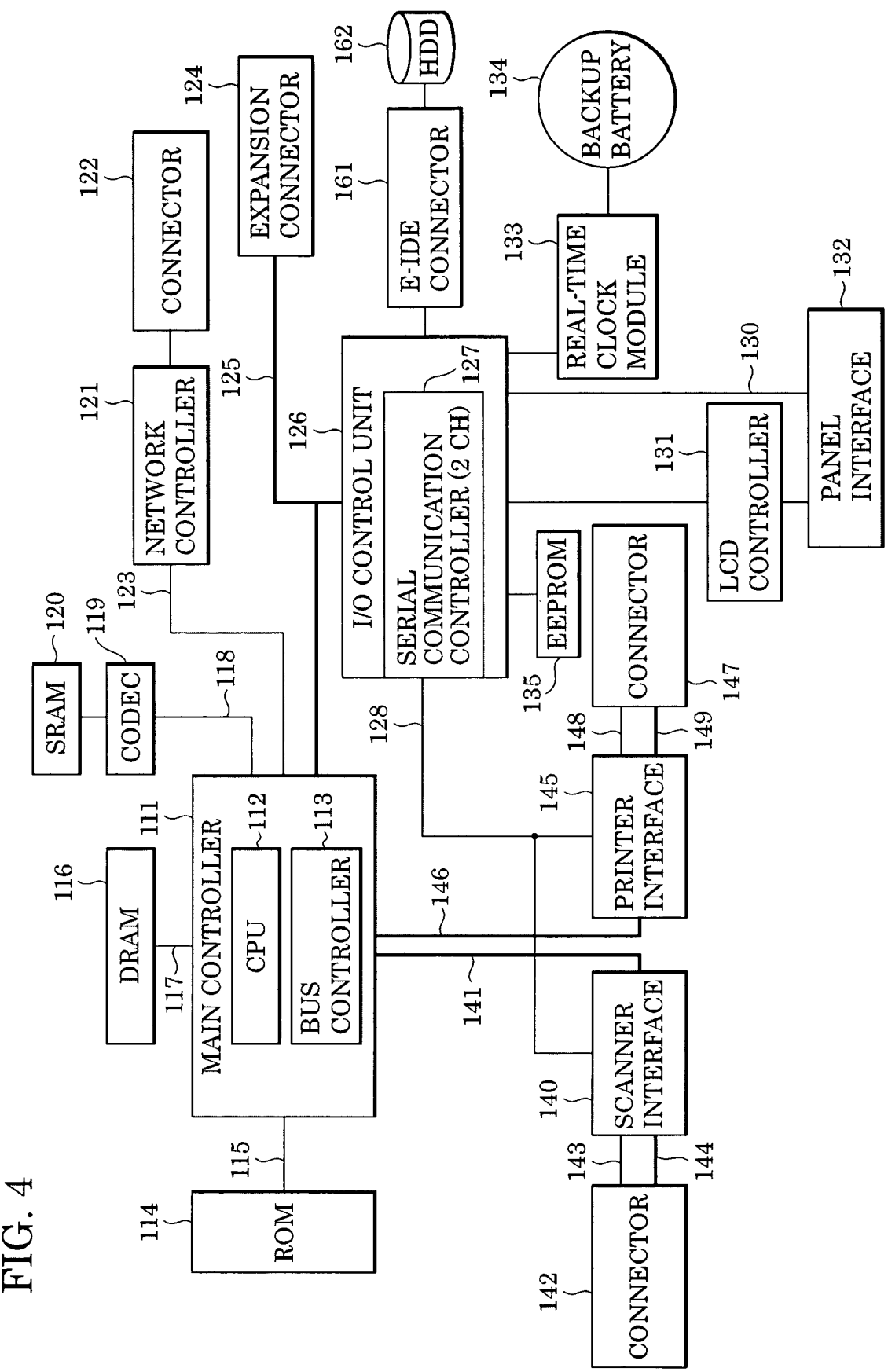
FIG. 4 is a block diagram illustrating details of a control device according to the embodiment of the present invention.

FIG. 4 is a block diagram illustrating the details of the control device 110. More specifically, a main controller 111 includes a CPU (Central Processing Unit) 112, bus controller 113, and various kinds of controller circuits described later. The main controller 111 is connected to ROM (Read Only Memory) 114 via a ROM interface 115, to DRAM (Dynamic Random Access Memory) 116 via a DRAM interface 117, to a CODEC (Coder/Decoder) 119 via a CODEC interface 118, to a network controller 121 via a network interface 123, and performs predetermined control operations between the main controller 111 and the LAN 600 through a connector 122. Examples of a network include the Ethernet, which is commonly employed.

The ROM 114 stores various kinds of control programs executed by the CPU 112 of the main controller 111, and computation data. The DRAM 116 is employed as a work region in which the CPU 112 works, or a region for storing image data. The CODEC 119 compresses a raster image stored in the DRAM 116 using a known compression method such as MH (modified Huffman)/MR (modified READ)/ MMR (modified-modified READ)/JBIG (joint bi-level image experts group), or the like, and elongates the compressed data to a raster image. The CODEC 119 is also connected with SRAM (Static RAM) 120, and the SRAM 120 is employed as the temporary work region of the CODEC 119.

The main controller 111 is also connected to a scanner interface 140 via a scanner bus 141, to a printer interface 145 via a printer bus 146, and further to an expansion connector 124 for connecting an expansion board via a general high-speed bus 125 such as a PCI (peripheral component interconnect) bus, and I/O (input/output) control unit 126.

The I/O control unit 126 is equipped with two channels of an asynchronous serial communication controller 127 for sending/receiving a control command as to the reader device 200 or printer device 300, and the serial communication controller 127 is connected to the scanner interface 140 and printer interface 145 via an I/O bus 128.

The scanner interface 140 is connected to a scanner connector 142 via a first asynchronous serial interface 143 and first video interface 144. The scanner connector 142 is connected to the scanner unit 210 of the reader device 200. The scanner interface 140 subjects the image data received from the scanner unit 210 to desired binarization or variable power processing in the main scanning direction or sub scanning direction, generates a control signal based on the video signal sent from the scanner unit 210, and transfers the image data to the main controller 111 via the scanner bus 141.

The printer interface 145 is connected to a printer connector 147 via a second asynchronous serial interface 148 and second video interface 149. The printer connector 147 is connected to the marking unit 320 of the printer device 300. The printer interface 145 subjects the image data output from the main controller 111 to smoothing processing, outputs the image data to the marking unit 320, and outputs a control signal generated based on the video signal sent from the marking unit 320 to the printer bus 146.

The CPU 112 operates based on a control program read from the ROM 114 via the ROM interface 115, for example, interprets the PDL (Page Description Language) data received from the client PC 601, and renders this into raster image data.

The bus controller 113 controls data transfer input/output to/from an external device connected to the scanner interface 140, printer interface 145, expansion connector 124, or the like, and also controls arbitration during a bus competition and DMA (Direct Memory Access) data transfer. More specifically, for example, data transfer between the DRAM 116 and CODEC 119, from the scanner unit 210 to DRAM 116, from the DRAM 116 to marking unit 320, and the like, is controlled by the bus controller 113, and DMA-transferred.

The I/O control unit 126 is connected to a panel interface 132 via an LCD (Liquid Crystal Display) controller 131 and key input interface 130, and the panel interface 132 is connected to the operating unit 150 (FIG. 2). The I/O control unit 126 is also connected to an EEPROM (Electrically Erasable Programmable Read-only Memory) 135 serving as nonvolatile memory, to a hard disk drive (HDD) 162 (equivalent to the image storing unit 160 in FIG. 2) capable of writing/reading image data via an E-IDE (Enhanced Integrated Drive Electronics) connector 161, and further to a real-time clock module 133 for updating/storing date and time managed within the device. The real-time clock module 133 is connected to a backup battery 134 and backed up by the backup battery 134.

Figure 5:
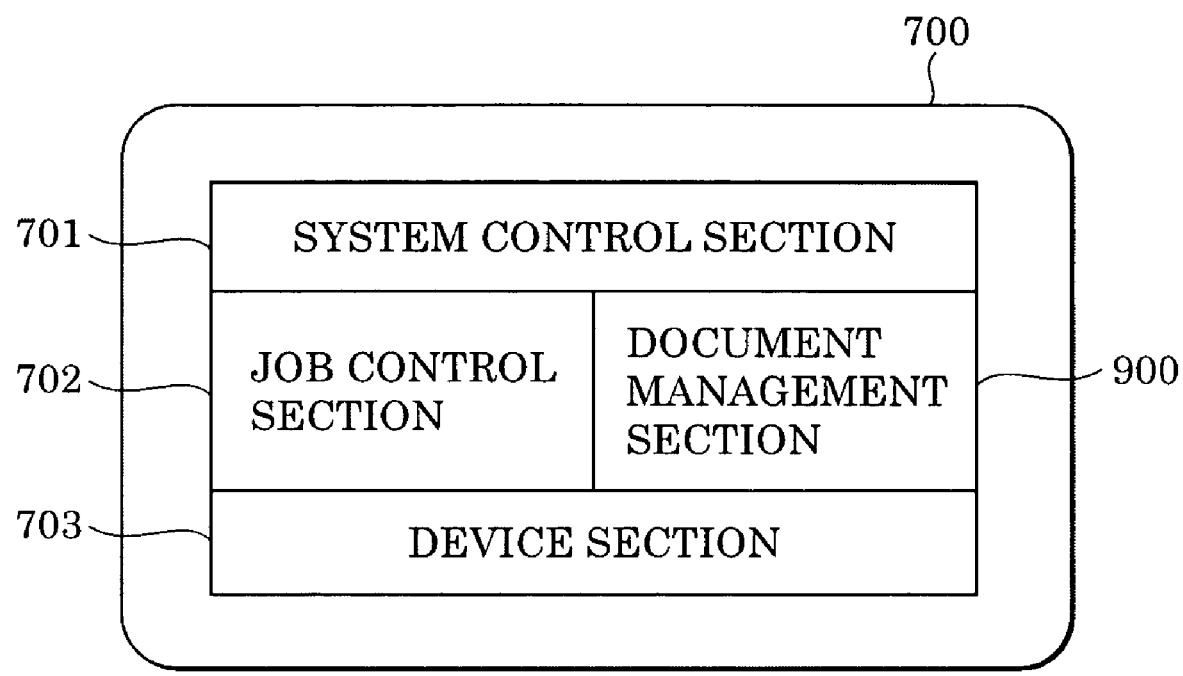
FIG. 5 is a diagram illustrating the software structure of the control device according to the embodiment of the present invention.

FIG. 5 is a diagram illustrating the internal software structure of the control device 110. Controller software 700 includes a system control section 701, job control section 702, a device section 703, and a document management section 900. The system control section 701 interprets a command (protocol) sent from the client PC 601, digital multi-function printer B 101, or operating unit 150, requests the job control section 702 to execute a job, and realizes the copy function, PDL (code data) print function, remote/multi-copy function, PDL clustering print function, substitution print function, and the like. The job control section 702 executes various kinds of job based on the request from the system control section 701. The device section 703 includes driver software for controlling each unit making up the digital multi-function printer A 100, and the driver software is employed in the event that the job control section 702 executes a job. The document management section 900 includes a function for controlling the image storing unit 160 to manage image data hierarchically, and is employed by the system control section 701 and job control section 702.

Figure 6:
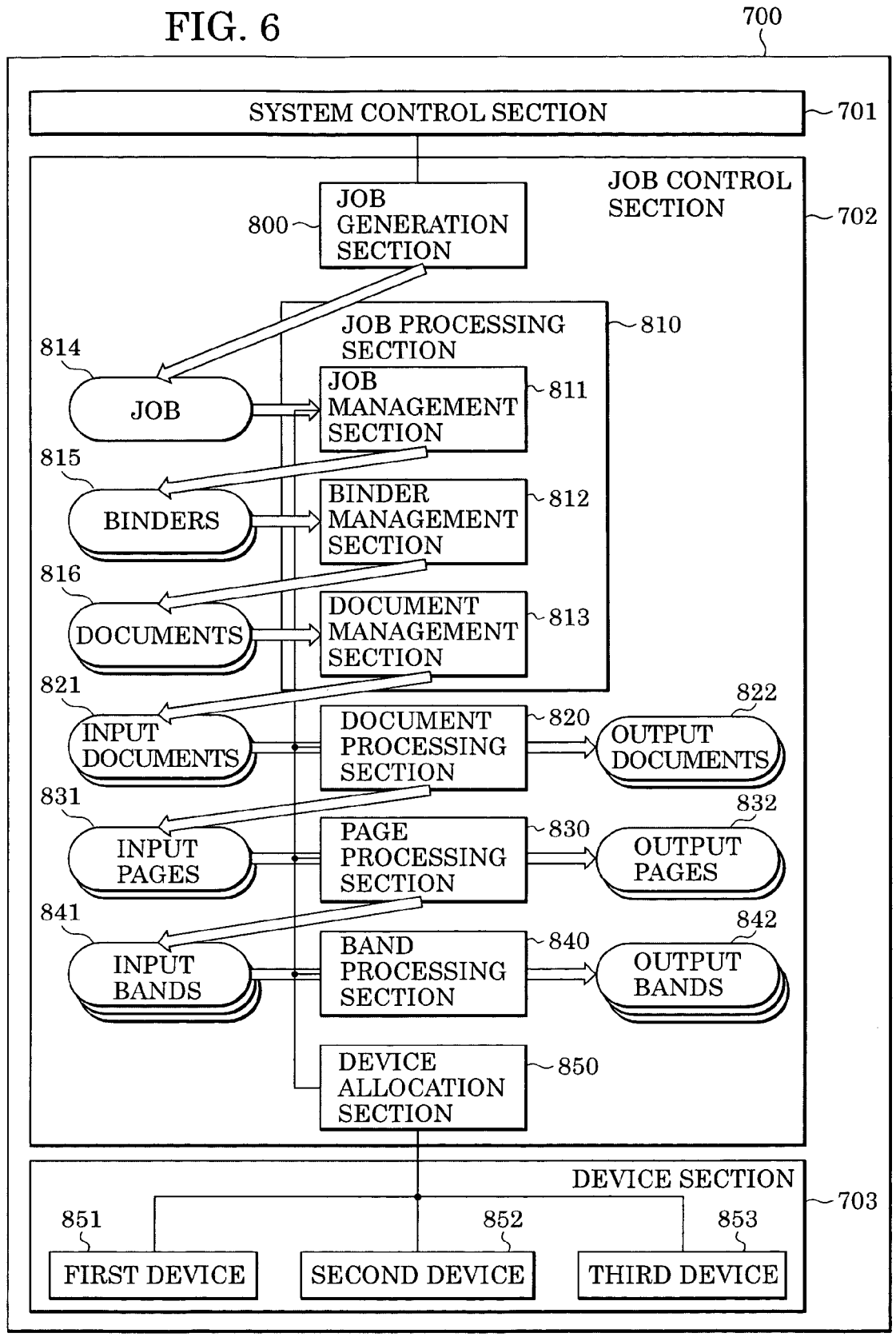
FIG. 6 is a diagram illustrating the structure of a job control section.

FIG. 6 is a diagram illustrating the system control section 701, the job control section 702, and the device section 703 of the controller software 700. FIG. 6 illustrates the structure of the job control section 702 of the controller software 700.

The job control section 702 includes a job generation section 800, job processing section 810, document processing section 820, page processing section 830, band processing section 840, and device allocation section 850. The job processing section 810 includes a job management section 811, binder management section 812, and document management section 813. The device section 703 may include driver software for controlling multiple devices such as a first device 851, second device 852, third device 853, and the like.

Series of operational requests sent from the client PC 601, operating unit 150, another digital multi-function printer 101, or the like are sent in a format called a command (protocol) via each interface. The command sent is interpreted by the system control section 701, and then transmitted to the job control section 702. At this time, the command is converted into a format that can be understood by the job control section 702.

The job generation section 800 generates a job 814. The job 814 includes a read image storage job, code data rendering storage job, storage image print job, image conversion job, and the like. The system control section 701 realizes the copy function, PDL (code data) print function, remote/multi-copy function, PDL clustering print function, and the like by combining the above-described jobs.

The command (protocol) interpreted and converted by the system control section 701 includes, in the event of the code data rendering storage job for example, the name of a document, number of copies at the time of printing, various settings information such as a discharge tray, code data (PDL data or compression image data), and the like. In the event of the read image storage job, the name of the document, number of copies at the time of printing, various settings information such as a discharge tray, read data of a document image, and the like, are included. The job 814 is sent to the job processing section 810, and processed. The job processing section 810 includes the job management section 811 in which the settings related to the entire job such as the output sequence of multiple binders making up the job, and the like are performed, the binder management section 812 in which the settings related to the entire binder such as the output sequence of multiple documents making up the binder, and the like are performed, and the document management section 813 in which the settings related to the entire document such as the output sequence of multiple pages making up a document, and the like are performed. With the job processing section 810, the settings and processing related to the entire job 814 are performed.

Furthermore, with the job processing section 810, the job 814 is divided into even smaller job-unit, binders 815 making up the job 814 except for the settings and processing related to the entire job 814, and the binders 815 are divided into even smaller job-unit, documents 816 making up the binder 815 except for the settings and processing related to the entire binder 815. The documents 816 are correlated with input documents 821 one to one, and the input documents 821 are subjected to processing for converting into output documents 822 by the document processing section 820. For example, let us consider a scan job including a bundle of documents that are read by the scanner and converted into multiple image data. The settings and operational procedure related to the bundle of the documents are described in the input documents 821, and the settings and operational procedure related to the multiple image data are described in the output documents 822. The document processing section 820 converts the bundle of sheets into multiple sets of image data.

The document processing section 820 performs processing for converting the document-based input documents 821 into the output documents 822, and except for the settings and processing related to the entire document, divides the documents 816 into even smaller job-units which are input pages 831, and requests the page processing section 830 to perform processing. This is the same as the case in which the job processing section 810 is dedicated to job-based processing, and generates the binders 815 and documents 816 to perform even smaller jobs. More specifically, the document-based settings and operations are related to page sequence such as sorting of pages, specification of both-sided printing, addition of covers, and OHP (overhead projector) slip sheets.

The page processing section 830 performs processing for converting the page-based input pages 831 into the output pages 832. For example, in the case of a scan job, various settings, such as read resolution and read orientation (landscape/portrait), and procedure are described in the input pages 831, and the settings such as the storage location of image data and procedure are described in the output pages 832.

Description has been made regarding the case in which increments in which a job is handled is gradually reduced so as to handle a page-based job so far. If an expensive system having page memory for each page can be employed, a job should eventually be divided into pages. However, in reality, in the event that page memory for each page cannot be acquired, for example due to memory costs and so forth, an arrangement may be made in which the job 814 is processed with several lines worth of memory (band memory). In this case, pages are divided into even smaller units, i.e., bands, and conversion processing is performed. The input bands 841, band processing section 840, and output bands 842 are applied to this case, and the operations of these are the same as the case of pages.

Any of the job processing section 810, document processing section 820, page processing section 830, and band processing section 840 employs various physical devices making up the digital multi-function printer A 100 at the time of proceeding with the corresponding processing. Upon multiple processing sections proceeding with a job simultaneously, device competition occurs. It is the device allocation section 850 that arbitrates this device competition. For example, the first through third devices 851 through 853 are logical devices allocated to the above-described respective processing sections by the device allocation section 850. Examples of these devices include page memory, band memory, the document feeding unit 250, marking unit 320, and scanner unit 210.

Figure 7:
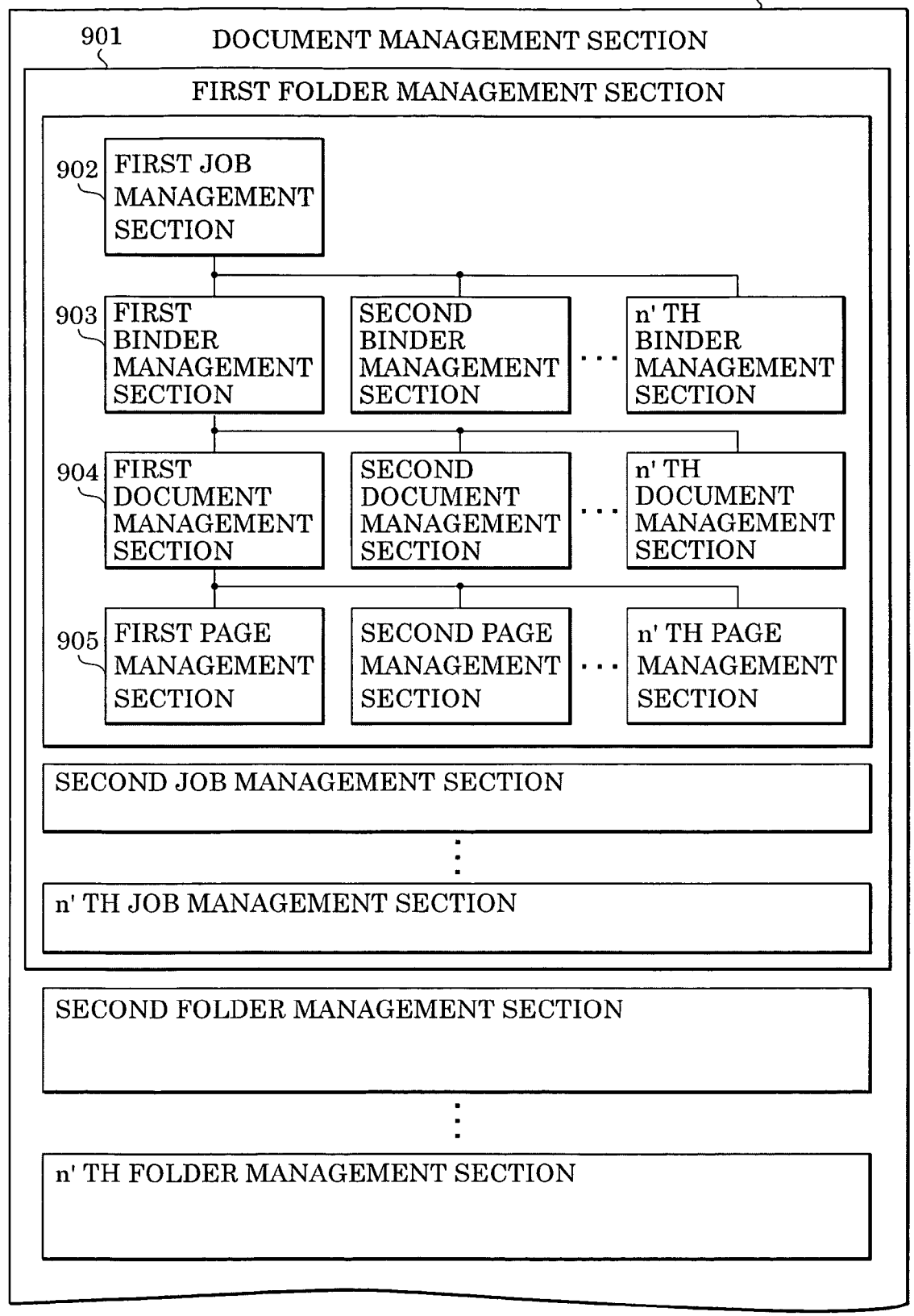
FIG. 7 is a diagram illustrating the concept of management structure of a document management section according to the embodiment of the present invention.

FIG. 7 is a diagram illustrating the concept of management structure of the document management section 900. The document management section 900 includes a folder management section 901, a job management section 902, a binder management section 903, a document management section 904, and a page management section 905, each of which includes management information (attribute values). The document management section 900 includes one or more folder management sections 901 including management information stored therein.

The folder management section 901 includes one or more job management sections 902 including management information stored therein. The job management section 902 includes one or more binder management sections 903 including management information stored therein. Further, the job management section 902 includes necessary information for the operations of the job 814 processed by the job control section 702, and the attribute values stored in the job management section 811 can be stored/retained. The binder management section 903 includes one or more document management sections 904 including management information stored therein. Further, the binder management section 903 includes necessary information for the operations of the binder 815 processed by the job control section 702, and the attribute values stored in the binder management section 812 can be stored/retained.

The document management section 904 includes one or more page management sections 905 including management information stored therein. Further, the document management section 904 can store/retain the attribute values stored in the document management section 813 processed by the job control section 702, and the attribute values of the output documents 822 processed by the document processing section 820. The page management section 905 is correlated with one page worth of image data stored in the image storing unit 160 or read by the scanner, and with one page worth of image data in which the PDL sent from the client PC is rendered. Further, the page management section 905 can store/retain the attribute values of the output pages 832 processed by the page processing section 830 of the job control section 702. In other words, the information stored in the document management section 900 and the job 814 input from the image data stored in the image storing unit 160 at the time of storing an image can be reproduced. Setting the information stored again allows the job to perform operations different from those of the job at the time of input.

Figure 8:
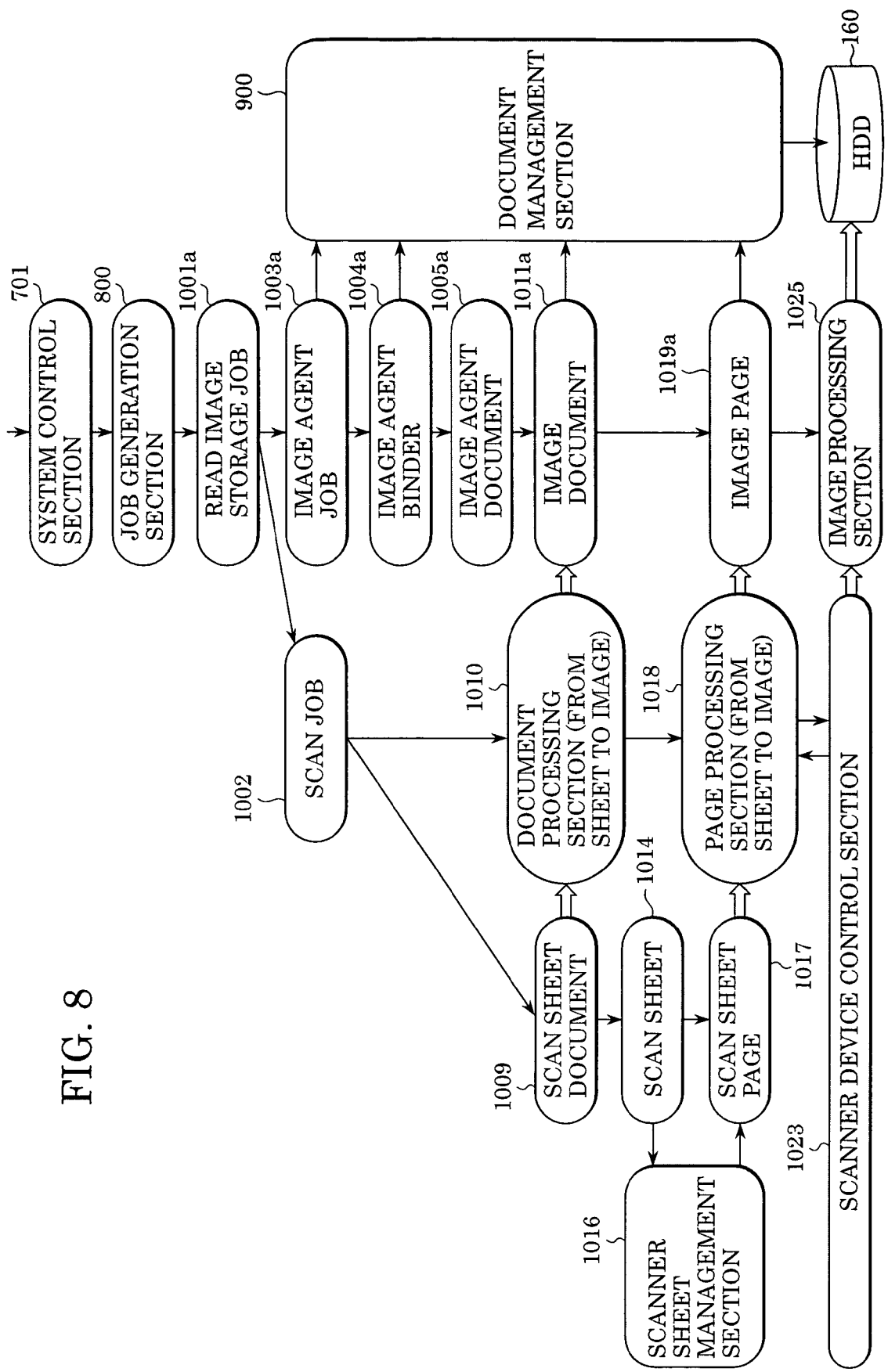
FIG. 8 is a diagram illustrating a structure example of a read image storage job serving as a job executed by the control device according to the embodiment of the present invention.

FIG. 8 is a diagram illustrating an example structure of the read image storage job serving as a job included in the job 814 executed by the control device 110. Series of the operational requests sent from the client PC 601, digital multi-function printer 101, or operating unit 150, are sent in a format called a command (protocol) via each interface. The command sent is interpreted by the system control section 701, and then transmitted to the job control section 702. The command is then converted into a format that can be understood by the job control section 702. The job generation section 800 interprets the command sent, and generates a read image storage job 1001a. The read image storage job 1001a includes a function for storing the image read by the scanner unit 210 to the image storing unit 160, and generates a scan job 1002 and image agent job 1003a.

The image agent job 1003a generates an image agent binder 1004a serving as a unit for making up a job, and the image agent binder 1004a generates an image agent document 1005a serving as a unit for making up a binder. The image agent document 1005a generates an image document 1011a serving as an output document. The image document 1011a generated is sent to the scan job 1002 via the image agent document 1005a, image agent binder 1004a, and image agent job 1003a, read image storage job 1001a. The scan job 1002 executes the settings and processing related to the entire scan job 1002, and the settings and processing related to a binder. With the scan job 1002, due to the physical configuration of the scanner unit 210 and scanner document unit 250, one time scan operation can be controlled by a configuration of one job, one binder, and one document, so the binder 815 and document 816 are omitted in the present embodiment.

First, the scan job 1002 generates a scan sheet document 1009 serving as an input document, and next generates a document processing section (from sheet to image) 1010. Subsequently, the scan job 1002 informs the document processing section 1010 of the scan sheet document 1009 serving as an input document and the image document 1011a serving as an output document, and controls the document processing section (from sheet to image) 1010.

The scan sheet document 1009 serving as the input document of the scan processing is subjected to processing for converting into the image document 1011a serving as an output document by the document processing section (from sheet to image) 1010. The document processing section (from sheet to image) 1010 performs only the document-based processing, and even smaller jobs are performed by a scan sheet page 1017, page processing section (from sheet to image) 1018, and image page 1019a, which are the units of small jobs. The scan sheet document 1009 generates a scan sheet 1014 corresponding to each page of document sheets from which an image is read. Upon the scan sheet 1014 being generated, an identifier is added to this, and stored in a scanner sheet management section 1016, and then the scan sheet page 1017 is generated. The scan sheet management section 1016 determines the processing order of the scan sheet page 1017 based on the identifier added to the scan sheet 1014 and specification (order for reading documents and so forth) of a device.

The scan sheet page 1017 is converted into the image page 1019a by the page processing section (from sheet to image) 1018. The page processing section (from sheet to image) 1018 recognizes sequence for controlling a real scanner device, executes operations for reading a document (scan operation) by issuing an engine control command prepared at a scanner device control section 1023, and performs processing for converting the scan sheet page 1017 into the image page 1019a. The image page 1019a stores the image data read in the image storing unit 160 via an image processing section 1025 based on conditions such as an image storage mode. The image processing section 1025 performs conversion of resolution, conversion of coding, and so forth.

The document management section 900 manages the image data to be stored in the image storing unit 160 in the following units: the folder management section 901, job management section 902, binder management section 903, document management section 904, and page management section 905, each of which the setting (attribute) value employed by the job management section 811, binder management section 812, and document management section 813, the attribute value of the image document 1011a subjected to conversion processing by the document processing section (from sheet to image) 1010, the attribute value of the image page 1019a subjected to conversion processing by the page processing section (from sheet to image) 1018, and the like are stored in the image agent job 1013, image agent binder 1014, image document 1011a, and image page 1019a, respectively. The stored image data can be read, copied, moved, removed, or the like via the image management section 900.

Figure 9:
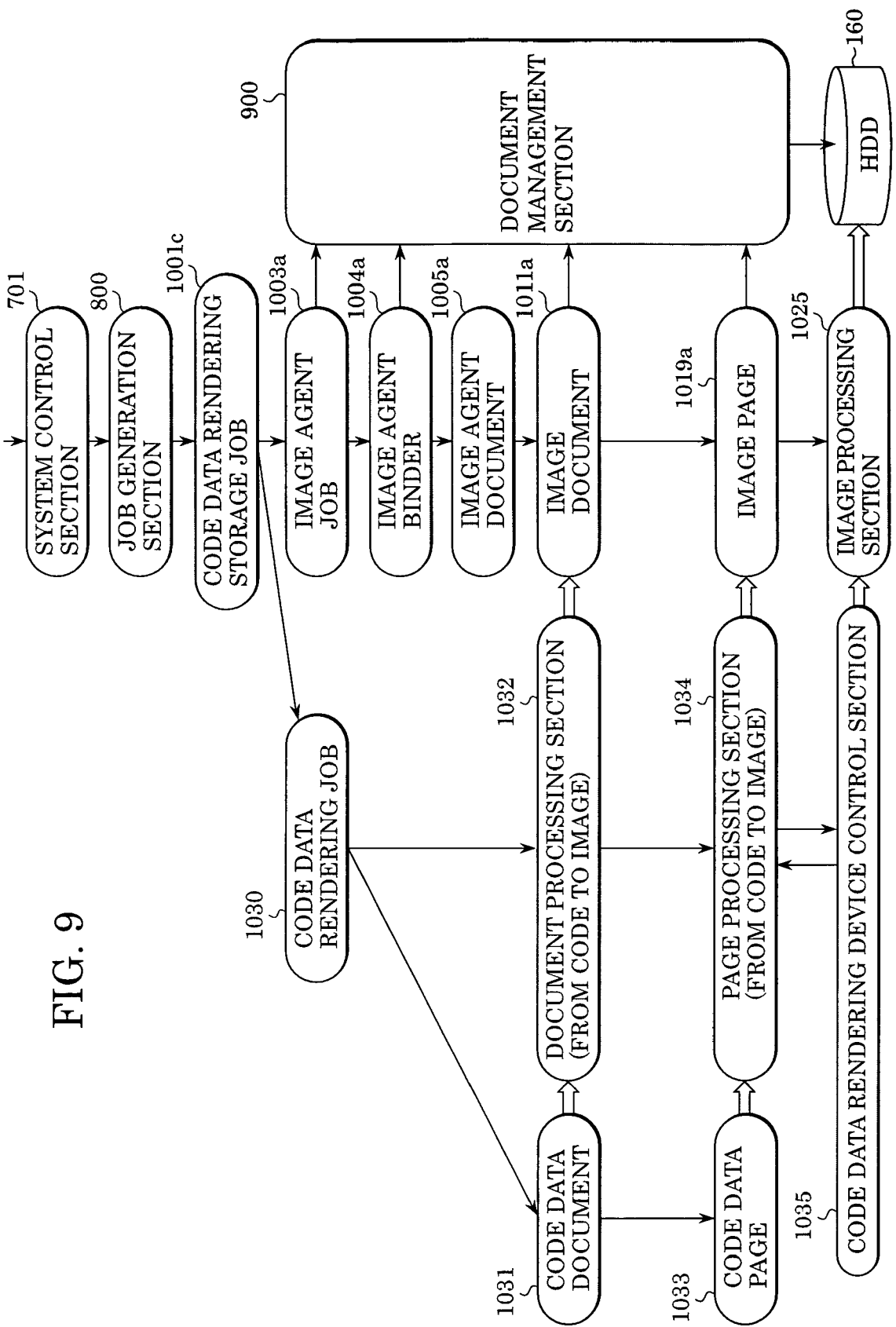
FIG. 9 is a diagram illustrating a structure example of code data rendering storage job serving as a job executed by the control device according to the embodiment of the present invention.

FIG. 9 is a diagram illustrating a structure example of the code data rendering storage job serving as one job included in the job 814 executed by the control device 110. Series of the operational requests sent from the client PC 601, digital multi-function printer 101, or operating unit 150, are sent in a format called a command (protocol) via each interface. The command sent is interpreted by the system control section 701, and then transmitted to the job control section 702. The command is then converted into a format that can be understood by the job control section 702. The job generation section 800 interprets the command sent, and generates a code data rendering storage job 1001c. The code data rendering storage job 1001c includes a function for rendering the code data (PDL data or compressed image) sent from the system control section 702 to an image data, and storing the image data in the image storing unit 160, and generates a code data rendering job 1030 and the image agent job 1003a.

The image agent job 1003a generates the image agent binder 1004a serving as a unit for making up a job, and the image agent binder 1004a generates the image agent document 1005a serving as a unit for making up a binder. The image agent document 1005a generates the image document 1011a serving as an output document. The image document 1011a generated is sent to the code data rendering job 1030 via the image agent document 1005a, image agent binder 1004a, and image agent job 1003a, code data rendering storage job 1001c.

The code data rendering job 1030 is included in the job processing section 810, and executes the settings and processing related to the entire code data rendering job 1030, and the settings and processing related to a binder. First, the code data rendering job 1030 generates a code data document 1031, which is an input document, and then generates a document processing section (from code to image) 1032. Subsequently, the code data rendering job 1030 informs the document processing section 1032 (from code to image) of the code data document 1031 serving as an input document and the image document 1011a serving as an output document, and controls the document processing section (from code to image) 1032.

The code data document 1031 serving as the input document of the code data rendering processing is subjected to processing for converting into the image document 1011a serving as an output document by the document processing section (from code to image) 1032. The document processing section (from code to image) 1032 performs only the document-based processing, and even smaller tasks are performed by a code data page 1033 serving as a unit of a small task, page processing section (from code to image) 1034, and the image page 1019a. The code data document 1031 identifies code data to be rendered into one page image from the code data received through the code data rendering storage job 1001c and code data rendering job 1030, and generates the code data page 1033 corresponding to one page worth of the code data thereof.

The code data page 1033 is converted into the image page 1019a by the page processing section (from code to image) 1034. The page processing section (from code to image) 1034 recognizes sequence for rendering code data into an image, executes image rendering processing by issuing a control command prepared at a code data rendering device control section 1035, and performs processing for converting the code data image 1033 into the image page 1019a. The image page 1019a stores the image data rendered in the image storing unit 160 via the image processing section 1025 based on conditions such as an image storage mode. The image processing section 1025 performs conversion of resolution, conversion of coding, and so forth.

The entity of the code data rendering device control section 1035 is a control program executed by the CPU 112. This control program receives one page worth of the code data correlated with the code data page 1033 via the page processing section (from code to image) 1034, and performs the processing corresponding to the type of code data, i.e., interprets the code data as PDL (Page Description Language) data, and performs processing for rendering into raster image data.

The document management section 900 manages the image data to be stored in the image storing unit 160 in the following units: the folder management section 901, job management section 902, binder management section 903, document management section 904, and page management section 905, each of which the setting (attribute) value employed by the job management section 811, binder management section 812, and document management section 813, the attribute value of the image document 1011a subjected to conversion processing by the document processing section (from sheet to image) 1010, the attribute value of the image page 1019a subjected to conversion processing by the page processing section (from sheet to image) 1018, and the like are stored in the image agent job 1013, image agent binder 1014, image document 1011a, and image page 1019a, respectively. The stored image data can be read, copied, moved, removed, or the like via the image management section 900.

Figure 10:
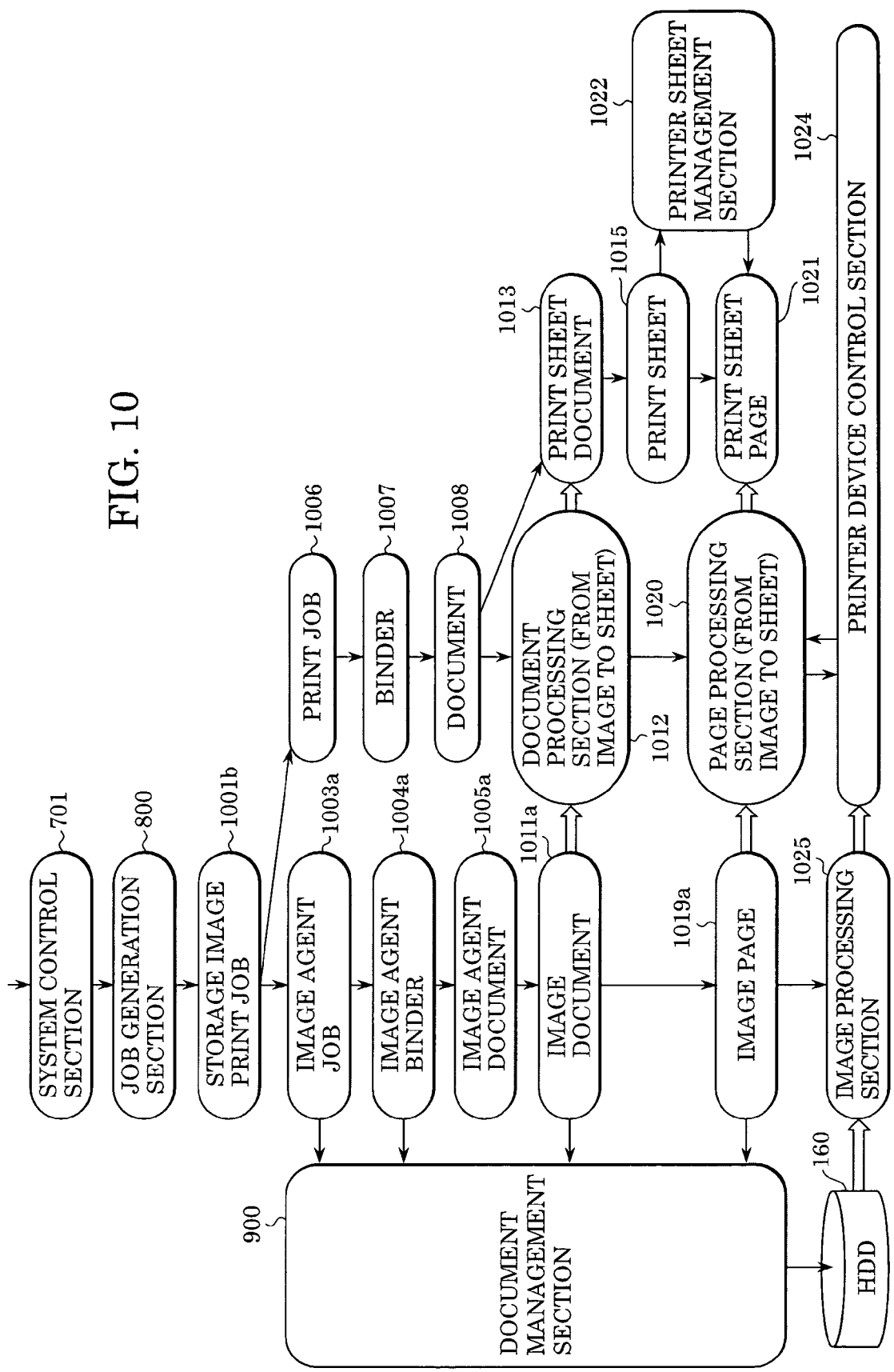
FIG. 10 is a diagram illustrating a structure example of a storage image print job serving as a job executed by the control device according to the embodiment of the present invention.

FIG. 10 is a diagram illustrating a structure example of the storage image print job serving as one job included in the job 814 executed by the control device 110. Series of the operational requests sent from the client PC 601, digital multi-function printer 101, or operating unit 150, are sent in a format called a command (protocol) via each interface. The command sent is interpreted by the system control section 701, and then transmitted to the job control section 702. The command is then converted into a format that can be understood by the job control section 702. The job generation section 800 interprets the command sent, and generates a storage image print job 1001b. The storage image print job 1001b is managed by the document management section 900, also includes a function for printing the image data stored in the image storing unit 160, and generates the image agent job 1003a and a print job 1006.

The image agent job 1003a generates the image agent binder 1004a serving as a unit for making up a job, and the image agent binder 1004a generates the image agent document 1005a serving as a unit for making up a binder. The image agent document 1006 generates the image document 1011a serving as an input document. The image document 1011a generated is sent to the print job 1006 via the image agent document 1005a, image agent binder 1004a, and image agent job 1003a, storage image print job 1001b.

The print job 1006 divides all except for the settings and processing related to the entire job into binders 1007 serving as even smaller units, and divides all except for the settings and processing related to the entire binder into documents 1008 serving as even smaller units. At this time, the image document 1011a serving as an input document is also sent.

First, the document 1008 to which the image document 1011a serving as an output document is sent generates the print sheet document 1013 which is an output document, and next generates the document processing section (from image to sheet) 1012. Subsequently, the document 1008 informs the document processing section 1012 (from image to sheet) of the image document 1011a serving as an input document and print sheet document 1013 serving as an output document, and controls the document processing section (from image to sheet) 1012.

The image document 1011*a* serving as the input document of the print processing is subjected to processing for converting into the print sheet document 1013 serving as an output document by the document processing section (from image to sheet) 1012. The document processing section (from image to sheet) 1012 performs only the document-based processing, and even smaller jobs are performed by the image page 1019*a*, the page processing section (from image to sheet) 1020, and a print sheet page 1021, which are the units of small jobs. The print sheet document 1013 generates a print sheet 1015 corresponding to each page of document sheets on which an image is actually output. Upon the print sheet 1015 being generated, an identifier is added to this, and stored in a print sheet management section 1022, which controls output processing sequence, and then the print sheet page 1021 is generated. The print sheet management section 1022 determines the processing order of the print sheet page 1021 based on the identifier added to the print sheet 1015 and specification (number of sheets to be circulated, imposition order of images, and so forth) of a device.

The image page 1019*a* is converted into the print sheet page 1021 by the page processing section (from image to sheet) 1020. The page processing section (from image to sheet) 1020 recognizes sequence for controlling a real printer device, executes a print operation by issuing an engine control command prepared at a printer device control section 1024, and performs processing for converting the image page 1019*a* into the print sheet page 1021. The image page 1019*a* extracts the image data stored in the document management section 900 from the image storing unit 160 via the image processing section 1025 based on conditions such as a printing mode. The image processing section 1025 performs image synthesis, conversion of resolution, conversion of coding, and so forth.

The document management section 900 manages the image data to be stored in the image storing unit 160 in the following units: the folder management section 901, job management section 902, binder management section 903, document management section 904, and page management section 905, each of which has stored therein the attributes at the time of storing images. With regard to the specified image data, the image data and attribute values thereof are extracted from the image storing unit 160 specified by the image agent job 1013, image agent binder 1014, image document 1011*a*, and image page 1019*a*.

Figure 11:
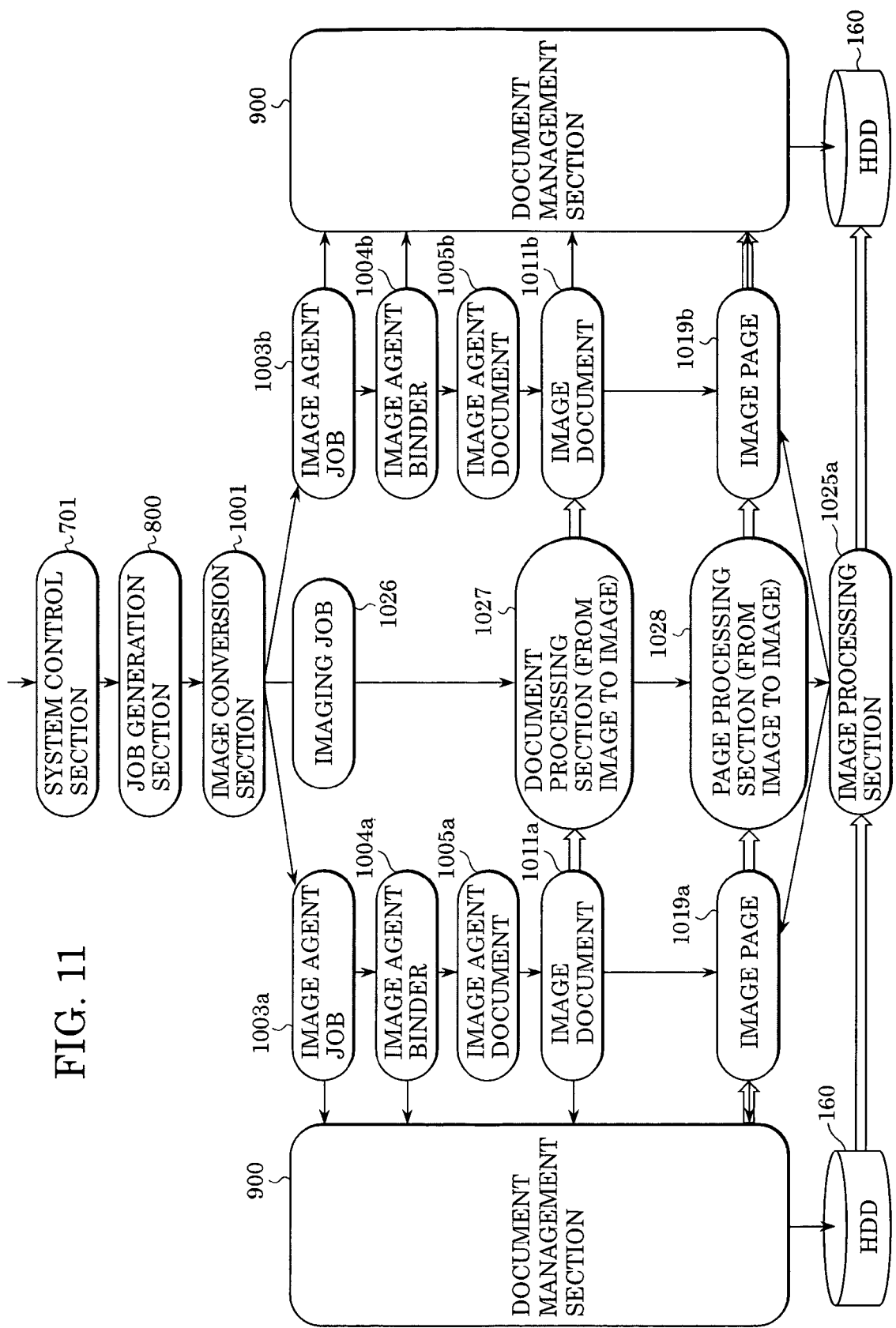
FIG. 11 is a diagram illustrating a structure example of an image conversion job serving as a job executed by the control device according to the embodiment of the present invention.

FIG. 11 is a diagram illustrating a structure example of an image conversion job, which executes editing (rotation, variable power) of each page of the stored image data, and synthesis (layout) processing of multiple pages, and stores the results thereof, serving as one job included in the job 814 executed by the control device 110.

Series of the operational requests sent from the client PC 601, or operating unit 150, are sent in a format called a command (protocol) via each interface. The command sent is interpreted by the system control section 701, and then transmitted to the job control section 702. The command is then converted into a format that can be understood by the job control section 702. The job generation section 800 interprets the command sent, and generates an image conversion job 1001 and requests control.

The image conversion job 1001 includes a function for realizing image conversion operation, generates the input side image agent job 1003*a*, an output side image agent job 1003*b*, and an imaging job 1026, and realizes image conversion processing by controlling the above-described operations.

The input side image agent job 1003*a* generates the input side image agent binder 1004*a*, the input side image agent binder 1004*a* generates the input side image agent document 1005*a*, and the burden of processing is shared hierarchically therebetween.

The input side image agent document 1005*a* generates the image document 1011*a* serving as the input document of a document processing section (from image to image) 1027, and the image document 1011*a* generates the image page 1019*a*. The image page 1019*a* is correlated with the image data of the document loaded, and reads out the image data stored in the image storing unit 160.

In the same way, the output side image agent job 1003*b* generates the output side image agent binder 1004*b*, the output side image agent binder 1004*b* generates the output side image agent document 1005*b*, and the burden of processing is shared hierarchically therebetween.

The output side image agent document 1005*b* generates the image document 1011*b* serving as the output document of the document processing section (from image to image) 1027, and the image document 1011*b* generates the image page 1019*b*. The image page 1019*b* is correlated with the image data following image editing or layout processing, and stores the image data following the conversion in the image storing unit 160.

The imaging job 1026 informs the document processing section (from image to image) 1027 of the image document 1011*a* serving as an input document and the image document 1011*b* serving as an output document, and requests the conversion processing.

With the input side image document 1011*a*, the information regarding the image data prior to the conversion stored in the image storing unit is managed as attributes. On the other hand, with the output side image document 1011*b*, the information regarding the image data following the conversion is managed as attributes. Based upon these attributes, the document processing section (from image to image) 1027 controls the conversion from the input document to the output document, e.g., changes the page order of the image data, and controls page allocation for synthesizing multiple pages into one page layout.

The input image page 1019*a*, page processing section (from image to image) 1028, and output image page 1019*b* take charge of smaller processing than the document-based processing. The image documents 1011*a* and 1011*b* generate the image pages 1019*a* and 1019*b*, respectively, correlated with specific pages belonging to the document management section 904 of the document management section 900 in accordance with instructions from the document processing section (from image to image) 1027. The generated image pages 1019*a* and 1019*b* retain information regarding the image data stored prior to the conversion and information regarding the image data following the conversion as attributes. The page processing section (from sheet to image) 1028 controls the conversion from the image page 1019*a* serving as an input page to the image page 1019*b* serving as an output page based on the above-described attributes. The page processing section (from image to image) 1028 recognizes sequence for controlling an image processing device, and performs image conversion processing by controlling the image processing device, e.g., performs rotation of images, variable power (conversion of resolution), and layout processing for synthesizing multiple images into one image layout.

Description of Operations

Figure 12:
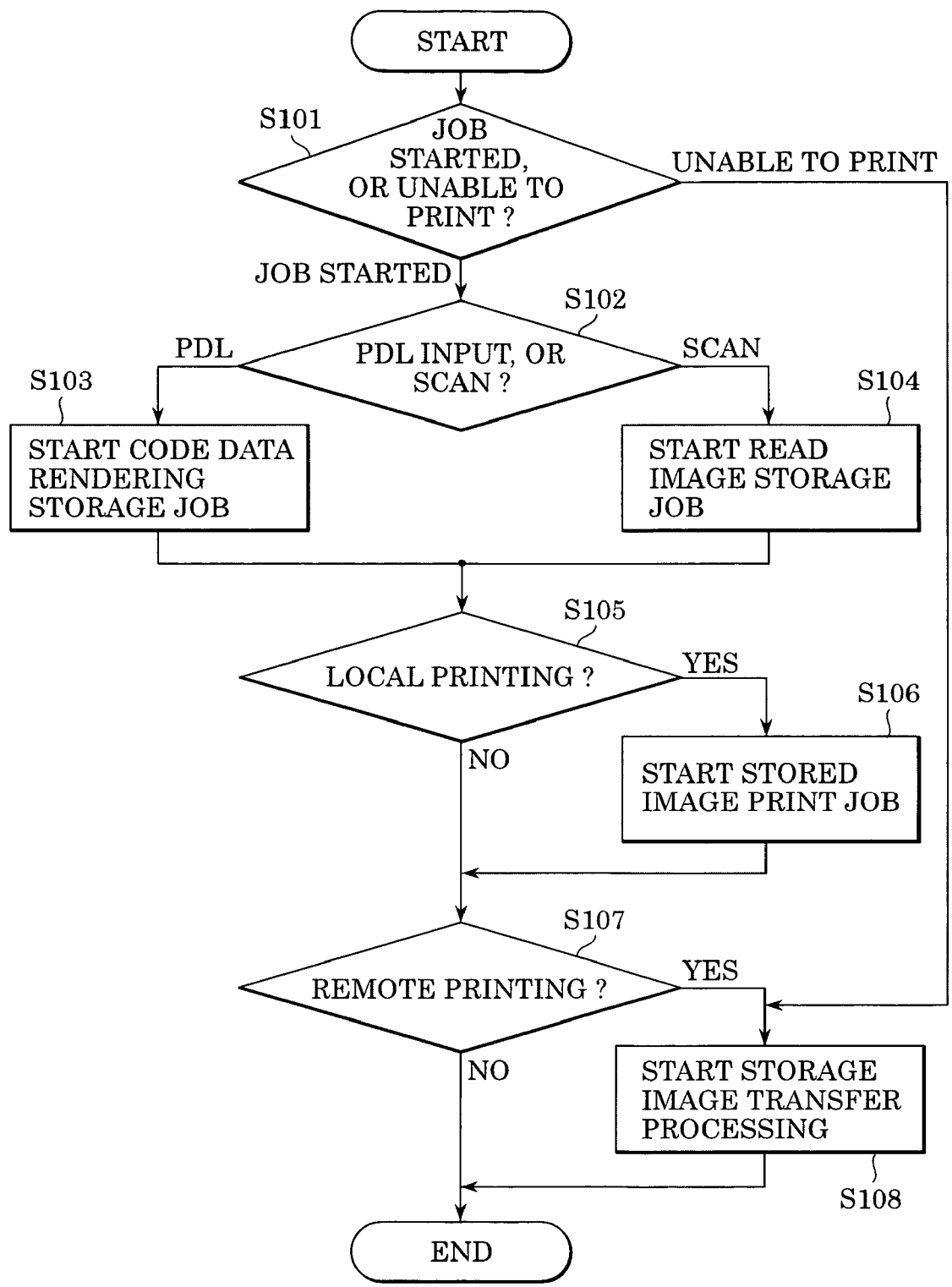
FIG. 12 is a flowchart illustrating an overview of processing of a system control section according to the embodiment of the present invention.

FIG. 12 is a flowchart illustrating an overview of processing of the system control section 701 in the controller software 700. This processing procedure shows the content of control processing to be executed by the CPU 112 of the control device 110, and is performed by the CPU 112 reading out and executing the control program stored in the ROM 114.

In Step S101 of FIG. 12, the system control section 701 determines whether or not the request command of a new job has been sent from the client PC 601, digital multi-function printer B 101, operating unit 150, or the like, or whether or not the job control section 702 of the controller software 700 has informed the system control section 701 that a job has not been able to print due to an error regarding the printer device 300 (failure or out of recording sheets/developing agent) and so forth.

In the event that printing has not been able to be performed (no in Step S101), transfer processing of the stored image is started in Step S108 so that the image data attempted to be printed by the job that has not been able to perform printing is transferred to a remote device (digital multi-function printer B 101 or page printer 102) to perform substitution printing. For example, the information of a faulty device to be transferred in the case of the above-described error may be set in the DRAM 116 by user instructions to the operating unit 150 beforehand. An arrangement may be made in which the user checks the status and performance of each device, and then determines the information to be transferred, prior to transfer.

On the other hand, in the event of the request command of a new job (yes in Step S101), the system control section 701 determines whether the content of processing of the job is rendering code data (PDL data or compressed image data) or reading a document image with reference to the request command in Step S102. In the event of rendering code data, the system control section 701 requests the job control section 702 to start the above-described code data rendering storage job in Step S103. In the event of reading a document image, the system control section 701 requests the job control section 702 to start the above-described read image storage job in Step S104.

Next, in Step S105, the system control section 701 determines whether or not there is the need to perform printing by using the local printer device 300 with reference to the request command. In the event that any one of the copy function, multi-copy function, code data print function, and PDL clustering print function is specified, there is the need to perform printing using the local printer 300. In this case (yes in Step S105), processing moves to Step S106 and the image data stored for the job started in S103 or S104 is specified as an object to be printed, and the job control section 702 is requested to start the above-described storage image print job.

Next, in Step S107, the system control section 701 determines whether or not there is the need to perform printing by using a remote device, with reference to the request command. In the event that any one of the remote copy function, multi-copy function, and PDL clustering print function is specified, there is a need to perform printing by using the remote device. In this case (yes in Step S107), processing moves to Step S108 and transfer processing of the stored images is started for the job started S103 or S104 to print the stored image data by using the remote device (digital multi-function printer B 101 or page printer 102). The remote device serving as a transfer destination and the number thereof are specified by the request command. An arrangement may be made in which the system control section 701 inquires the status and performance of each remote device, and then determines the remote device serving as a transfer destination based on the status of the remote devices. The system control section 701 repeats the processing in Step S108 until the number of repetition reaches the number of the remote devices serving as a transfer destination (repeat loop is not shown in the drawing).

Figure 13:
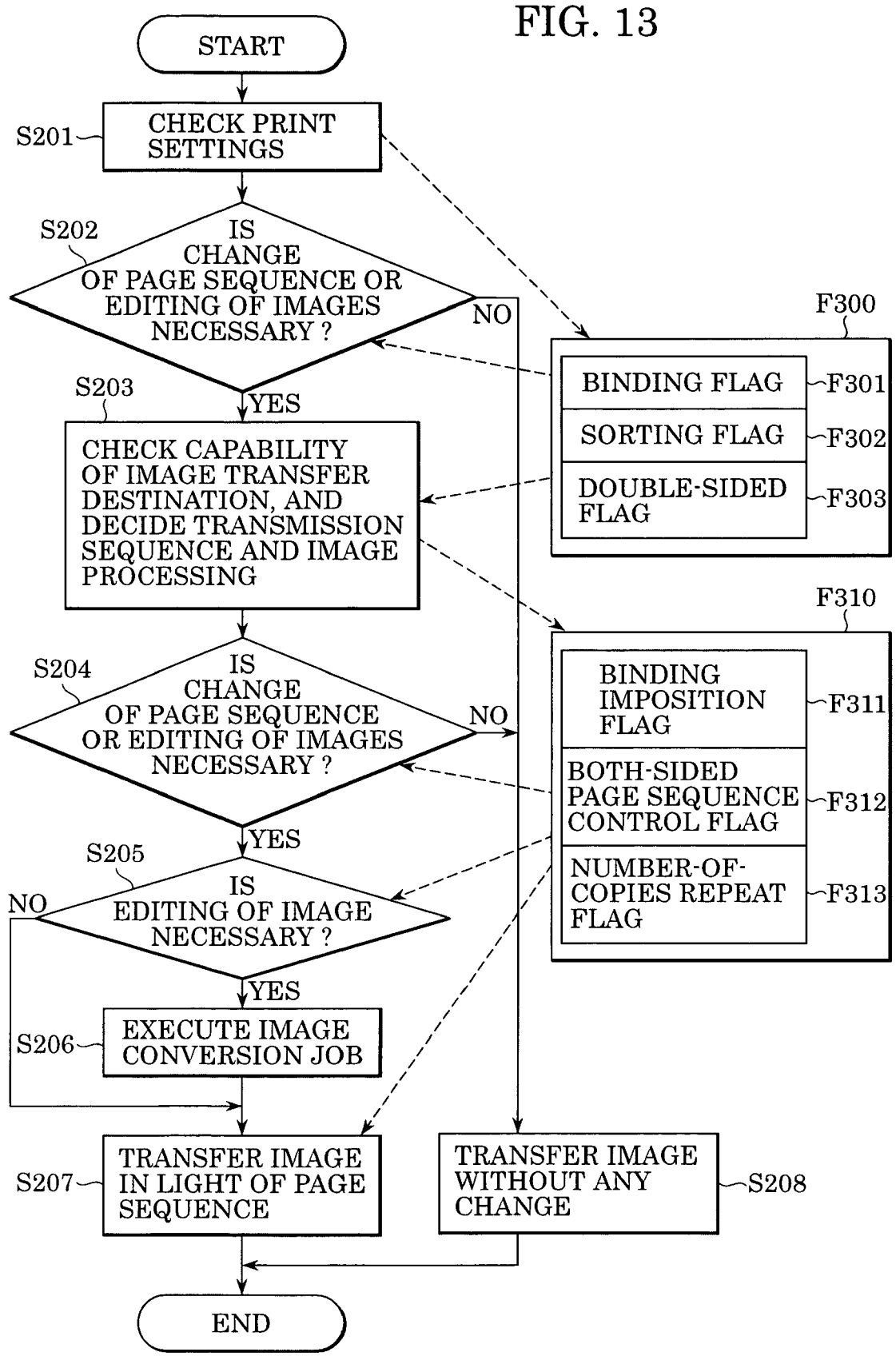
FIG. 13 is a flowchart illustrating transfer processing of stored images according to the embodiment of the present invention.

Transfer processing of the stored images, which is started in Step S108 in FIG. 12 is described in further detail next with reference to FIGS. 13 and 14. FIG. 13 includes a flowchart illustrating the transfer processing of the stored images, and a diagram illustrating variables (flags) in the DRAM 116 which are set and referred to during the transfer processing. FIG. 14 is a flowchart illustrating in further detail the processing in Step S203 in FIG. 13.

In FIG. 13, print setting flags (F300) are flags denoting the print settings of an image to be transferred, and include a binding flag (F301), a sorting flag (F302), and a double-sided flag (F303). Substitution flags (F310) are flags denoting the content of processing to be substituted instead of the remote device serving as a image transfer destination, and include a binding imposition flag (F311), a both-sided page sequence control flag (F312), and a number-of-copies repeat flag (F313). The binding imposition flag (F311) is a flag for instructing processing for generating a 2-in-1 layout image by reducing or rotating two images as necessary in accordance with the page sequence for binding printing. The both-sided page sequence control flag (F312) is a flag for instructing processing for changing the page sequence of the image data in transfer and fixing order in the case of improving productivity of both-sided printing. The number-of-copies repeat flag (F313) is a flag for instructing processing for repeating image transfer until the number of repetition reaches the number of copies to perform sorting print of multiple copies without using the image spool region of the remote device serving as an image transfer destination.

In FIG. 13, the system control section 701 checks the print settings of the image to be transferred with reference to the request command, and then sets the print setting flags (F300) in Step S201. First, the system control section 701 initializes all of the print setting flags (F300) to FALSE (=0), sets the binding flag (F301) and double-sided flag (F303) to TRUE (=1) in the event that the binding printing is set, sets the sorting flag (F302) to TRUE (=1) in the event that the sorting print is set, and sets the double-sided flag (F303) to TRUE (=1) in the event that the double-sided print is set.

In Step S202, the system control section 701 determines whether or not there is the need to change the page sequence of transfer images or perform image editing (2-in-1 layout image generation for binding printing) based on the results in Step S201. In the event that the binding printing, electronic sorting printing, both-sided printing, or the like are set, the remote device serving as an image transfer destination needs to have the following capabilities.

i) Binding printing and electronic sorting printing need to have one job worth of image spool capacity.
ii) Binding printing needs to have image processing function for performing 2-in-1 layout.
iii) Both-sided printing needs to have image spool capacity corresponding to the number of both-sided circulation sheets.

In the event that the remote device serving as a image transfer destination does not have sufficient capabilities, changing page sequence and image editing are necessary, and accordingly, it can be concluded that only a case in which all of the binding flag (F301), sorting flag (F302), and double-sided flag (F303) are FALSE does not need changing page sequence and image editing. If changing page sequence and image editing are not necessary (no in Step S202), processing moves to step S208 and the system control section 701 transfers the stored image without any change.

On the other hand, if any one of the print setting flags (F300) is set to TRUE (yes in Step S202), processing moves to Step S203 and the system control section 701 inquires the remote device serving as a image transfer destination specified by the request command, checks capability thereof (image spool capacity for electronic sorting printing, image processing function, image spool capacity corresponding to the number of both-sided circulation sheets, and the like), and then sets the substitution flags (F310). The detailed processing of Step S203 is described with reference to FIG. 14 next.

In FIG. 14, the system control section 701 initializes all of the substitution processing flags (F310) to FALSE in Step S401. Next, in Step S402, it is determined if the sorting flag (F302) is set to TRUE. If the sorting flag (F302) is FALSE (no in Step S402), processing proceeds to Step S405. On the other hand, if the sorting flag (F302) is TRUE (yes in Step S402), processing proceeds to step S403 and the system control section 701 inquires the remote device serving as an image transfer destination and determines whether the remote device serving as an image transfer destination has image spool capacity sufficient for storing one job worth of all images to be transferred. If it is determined that all images can be stored (yes in Step S403), the flow proceeds to Step S405. On the other hand, if it is determined that not all images can be stored (no in Step S403), the system control section 701 sets the number-of-copies repeat flag (F313) to TRUE in Step S404.

In Step S405, it is determined if the double-sided flag (F303) is set to TRUE. If the double-sided flag (F303) is FALSE (no in step S405), processing proceeds to Step S408. However, if the double-sided flag (F303) is TRUE (yes in Step S405), processing proceeds to Step S406 and the system control section 701 inquires the remote device serving as an image transfer destination, and determines whether the remote device serving as an image transfer destination can secure an image spool region for realizing transfer and fixing sequence for improving productivity of both-sided printing by controlling the intervals of recording sheets within a transporting path to be narrowed, which has been described with reference to FIG. 3. If it is determined that the image spool region can be secured (yes in Step S406), processing proceeds to Step S408, otherwise, processing proceeds to Step S407 and the system control section 701 sets the both-sided page sequence control flag (F312) to TRUE.

In Step S408, it is determined whether the binding flag (F301) is set to TRUE. If the binding flag (F301) is FALSE (no in Step S408), the processing ends. On the other hand, if the binding flag is TRUE (yes in Step S408), processing moves to step S409 and the system control section 701 inquires the remote device serving as an image transfer destination, and determines whether the remote device serving as an image transfer destination can execute processing for generating 2-in-1 layout images by reducing or rotating two images as necessary in accordance with the page sequence for the binding printing. If it is determined that the processing can be executed (yes in Step S409), the processing ends, otherwise, processing moves to step S410 and the system control section 701 sets the binding imposition flag (F311) to TRUE in S410, and then the processing ends.

Returning to FIG. 13, in Step S204, the system control section 701 determines whether there is a need to change the page sequence of transfer images or perform image editing based on the results in Step S203. More specifically, it can be concluded that only in the case that the binding imposition flag (F311), the both-sided page sequence control flag (F312), and the number-of-copies repeat flag (F313) are all FALSE is changing page sequence and image editing not needed. If it is determined that changing page sequence and image editing are not necessary (no in Step S204), the system control section 701 transfers the stored image without any change in Step S208.

On the other hand, if any one of the substitution processing flags (F310) is set to TRUE (yes in Step S204), processing moves to Step S205 and the system control section 701 determines whether image editing processing, such as rotation of an image, conversion of resolution, 2-in-1 layout, and the like, is necessary. It is determined that the image editing processing is not necessary when the binding imposition flag (F311) is FALSE. If it is determined that the image editing processing is not necessary (no in Step S205), processing proceeds to Step S207 and the images are transferred in accordance with the page sequence determined based on the substitution processing flags (F310) set in Step S203.

If, however, the binding imposition flag (F311) is TRUE and the image editing processing is required(yes in Step S205), processing proceeds to Step S206 and the system control section 701 requests the job control section 702 to execute the above-described image conversion job. In this case, the image conversion job generates a 2-in-1 image subjected to binding imposition. For example, if image data made up of 8 pages is processed, the image data is subjected to the image processing, such as variable power and rotation as necessary, a pair of the first and eighth images, second and seventh images, third and sixth images, and fourth and fifth images are laid out in 2-in-1 layout, and then 4-page images are created. Note that for simplicity of description herein, the word "page" will be omitted, in this case, referred to as "1 and 8, 2 and 7, 3 and 6, 4 and 5 are laid out in 2-in-1 layout", or referred to as "layout of 1 and 8" or the like (applied to a later-described example as well). The newly generated stored images are transferred in Step S207 in the page sequence determined based on the substitution processing flags (F310) set in Step S203.

In Step S207, the image data is transferred to the remote device serving as a transfer destination based on the substitution processing flags (F310) set in Step S203 as follows.

(a) In the case that the number-of-copies repeat flag (F313) and both-sided page sequence control flag (F312) are both FALSE: The image data is transmitted to the remote device serving as a transfer destination from the first page to the nth page (n is an integer) in forward order once.

(b) In the case that the number-of-copies repeat flag (F313) is TRUE: The image data is transmitted repeatedly until the number of repetition reaches the number of copies. For example, in the case of 8-page image data, while the image data is transmitted to a digital multi-function printer, which has an equivalent capability, from the first page to eighth page in forward order once, the image data is transmitted to the remote device, which does not have spool capacity sufficient for one job, from the first page to eighth page repeatedly until the number of repetition reaches the number of copies.

(c) In the case that the both-sided page sequence control flag (F312) is TRUE: The image data is transmitted in both-sided circulation order to improve print productivity. For example, in the case of 8-page image data, while the image data is transmitted to a digital multi-function printer, which has an equivalent capability, from the first page to eighth page in forward order, the image data is transmitted to the remote device, which does not have spool capacity sufficient for controlling the intervals between recording sheets within a transporting path to be narrowed as shown in FIG. 3 and described above, in the page sequence of 1, 3, 2, 5, 4, 7, 6, and 8 (front, front, back, front, back, front, back, and back), for example such that the intervals between recording sheets within a transporting path can be narrowed. According to this page sequence, at least one page worth of the image spool region can be saved at the remote device serving as a transfer destination.

(d) In the case that the number-of-copies repeat flag (F313) and both-sided page sequence control flag (F312) are both TRUE: In the event of transmitting 8-page image data twice, in order to prevent productivity from deterioration even with a discontinuity between copies, the image data is transmitted in the page sequence of 1, 3, 2, 5, 4, 7, 6, 1, 8, 3, 2, 5, 4, 7, 6, and 8 (front, front, back, front, back, front, back, front, back, front, back, front, back, front, back, back) for example.

Further, additional description is provided below regarding the sequence of transfer and fixing at the time of both-sided printing. As shown in FIG. 3 and described above, in the event that both-sided recording is performed onto multiple recording sheets consecutively, control is provided such that the intervals of recording sheets within a transporting path are narrowed within an image formation device. In this case, the image data is processed in accordance with the following procedure, for example.
(1) Feeding from a feeding cassette
(2) Transfer and fixing on the front side
(3) Feeding from a feeding cassette
(4) Transfer and fixing on the front side
(5) Re-feeding from the re-feeding transporting path
(6) Transfer and fixing on the back side
(7) Hereinafter, feeding, transfer and fixing on the front side, re-feeding, transfer and fixing on the back side are repeated
(8) Finally, re-feeding, transfer and fixing on the back side In other words, the image data is processed in the sequence of (front, front, back, front, back, front, back, . . . , back). For example, for 8-page image data, the image data is processed in the page sequence of 1, 3, 2, 5, 4, 7, 6, and 8 (front, front, back, front, back, front, back, and back). When the both-sided page sequence control flag is TRUE, the image data is transmitted to the remote device serving as a transfer destination in the sequence appropriate for the sequence of this transfer and fixing (the above-described (c) in Step S207). The transporting speed of recording sheets is generally fixed regardless of the location within the transporting path, and accordingly, the number of print pages per unit of time increases by narrowing the intervals between the recording sheets within the transporting path as described above. Thus, even with the remote device having insufficient spool capacity, control is provided so as to narrow the intervals between the recording sheets within the transporting path which improves print productivity.

Further, additional description is provided below regarding the sequence of transfer and fixing at the time of binding printing. For example, the processing for subjecting 8-page image data to binding printing is as follows.
(1) A pair of the first and eighth images, second and seventh images, third and sixth images, and fourth and fifth images are laid out in 2-in-1 layout (1 and 8, 2 and 7, 3 and 6, 4 and 5 are laid out in 2-in-1 layout, Step S207),
(2) each image data of layout images of 1 and 8, layout images of 2 and 7, layout images of 3 and 6, and layout images of 4 and 5 is transmitted to the remote device serving as a transfer destination,
(3) the remote device prints the image data transmitted on the front and back sides, i.e., both sides of the recording sheets, aligns a pair of the recording sheets of which both sides are printed, subjects the recording sheets to saddle stitching, and bends them.

Here, in the event of performing two copies with sorting, upon the above-described processing being repeated twice without respect to print productivity, the image data is transmitted to the remote device serving as a transfer destination in the following sequence, and the remote device performs the following transfer and fixing.
(1) Layout images of 1 and 8 (first copy, first sheet, front)
(2) Layout images of 2 and 7 (first copy, first sheet, back) →external discharge
(3) Layout images of 3 and 6 (first copy, second sheet, front)
(4) Layout images of 4 and 5 (first copy, second sheet, back) →external discharge
(5) Layout images of 1 and 8 (second copy, first sheet, front)
(6) Layout images of 2 and 7 (second copy, first sheet, back) →external discharge
(7) Layout images of 3 and 6 (second copy, second sheet, front)
(8) Layout images of 4 and 5 (second copy, second sheet, back)→external discharge With the present embodiment, in the case that the number-of-copies repeat flag and both-sided page sequence control flag are both TRUE, the image data is transmitted to the remote device serving as a transfer destination in the sequence of transfer and fixing in light of print productivity of the remote device (the above-described (d) in Step S207), and the remote device performs the following transfer and fixing.
(1) Layout images of 1 and 8 (first copy, first sheet, front) (the above-described (1))
(2) Layout images of 3 and 6 (first copy, second sheet, front) (the above-described (3))
(3) Layout images of 2 and 7 (first copy, first sheet, back) (the above-described (2))→external discharge
(4) Layout images of 1 and 8 (second copy, first sheet, front) (the above-described (5))
(5) Layout images of 4 and 5 (first copy, second sheet, back) (the above-described (4))→external discharge
(6) Layout images of 3 and 6 (second copy, second sheet, front) (the above-described (7))
(7) Layout images of 2 and 7 (second copy, first sheet, back) (the above-described (6))→external discharge
(8) Layout images of 4 and 5 (second copy, second sheet, back) (the above-described (8))→external discharge Thus, even with the remote device having insufficient spool capacity, control is provided such that the intervals between the recording sheets are not increased in light of print productivity of the remote device, and also print productivity is prevented from deterioration even with discontinuity between copies.

Thus, as described above, according to the present embodiment, it is possible to realize multi-copy print with electronic sorting, binding, and the like even if a remote device serving as an image transfer destination does not have a large volume of image spool capability, image processing capability, such as 2-in-1 layout when performing remote copy, substitution print or PDL clustering print. At least one page worth of an image spool region can be saved at the remote device serving as a transfer destination by transferring images in the sequence of transfer and fixing which improves productivity in both-sided printing.

Other Embodiments

The present invention can be applied other embodiments, such as those described below in addition to the above-described embodiment.

Another embodiment can be carried out with an arrangement in which the program code of software for realizing the above-described embodiment functions is supplied to a computer (CPU (central processing unit) or MPU (micro-processing unit)) within a device or system connected to various kinds of devices for realizing the above-described embodiment functions, and the device or system operates the various kinds of devices in accordance with the program stored in the computer.

In this case, the above-described program code of the software realizes the above-described embodiment functions.

Examples of the recording medium for storing the program code include floppy disks, hard disks, optical disks, magneto-optical disks, CD-ROM (compact disk ROM), magnetic tape, nonvolatile memory cards, and ROM.

The present invention encompasses arrangements in which the program code works in collaboration with the operating system (OS) on which the program code runs, or with other application software, or the like, to realize the above-described embodiment functions, as well as with the case that the above-described embodiment functions can be realized by the computer executing the supplied program code.

Further, the present invention encompasses arrangements in which the supplied program code is stored in memory equipped with a function expansion board installed in the computer, or a function expansion unit connected to the computer, following which a CPU or the like provided to the function expansion board or function expansion unit performs part or all of the actual processing, and the above-described embodiment functions are realized by the processing.

While the above-described embodiment has been described for exemplification of the present invention, other modifications may be made other than the above-described embodiment. All such modifications thereof are encompassed within the technical scope of the present invention as long as the modification is based on the technical concept of the present invention laid forth in the claims.

Thus, while the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-388468 filed Nov. 18, 2003, which is hereby incorporated by reference herein.

What is claimed is:

1. An image formation device comprising:
an input unit adapted to input image data;
a setting unit adapted to set a binding process to be performed on the image data input at the input unit;
a selecting unit adapted to select, according to a user's instruction, other image formation device to print the image data;
an obtaining unit adapted to obtain information on a capability of the other image formation device selected by the selecting unit;
a control unit adapted to control the image formation device to perform a page layout process on the image data for the binding process in a case where the other image formation device selected by the selecting unit is not capable of performing the binding process, and to control the image formation device not to perform the page layout process on the image data for the binding process in a case where the other image formation device selected by the selecting unit is capable of performing the binding process; and
a transmitting unit adapted to:

transmit, to the other image formation device selected by the selecting unit, the image data on which the page layout process for the binding process has been performed and to cause the other image formation device selected by the selecting unit to perform the binding process in cooperation with the image formation device in the case where the other image formation device selected by the selecting unit is not capable of performing the binding process, and transmit, to the other image formation device selected by the selecting unit, the image data on which the page layout process for the binding process has not been performed and to cause the other image formation device selected by the selecting unit to perform the binding process in the case where the other image formation device selected by the selecting unit is capable of performing the binding process.

2. An image formation device according to claim 1, further comprising a print device for printing the image data input by the input unit, wherein the transmitting unit transmits the image data to the other image formation device selected by the selecting unit when the print device is in a status in which the image data cannot be printed.

3. A processing method of an image formation device having a control unit and an input unit, the method comprising:
inputting image data at the input unit;
setting a binding process to be performed on the image data input at the input unit;
selecting, according to a user's instruction, other image formation device to print the image data;
obtaining information on a capability of the other image formation device selected in the selecting step;
controlling the image formation device with the control unit to perform a page layout process on the image data for the binding process in a case where the other image formation device selected in the selecting step is not capable of performing the binding process, and controlling the image formation device not to perform the page layout process on the image data for the binding process in a case where the other image formation device selected in the selecting step is capable of performing the binding process; and
transmitting, to the other image formation device selected in the selecting step, the image data on which the page layout process for the binding process has been performed and causing the other image formation device selected in the selecting step to perform the binding process in cooperation with the image formation device in the case where the other image formation device selected in the selecting step is not capable of performing the binding process; and
transmitting, to the other image formation device selected in the selecting step, the image data on which the page layout process for the binding process has not been performed and causing the other image formation device selected in the selecting step to perform the binding process in the case where the other image formation device selected in the selecting step is capable of performing the binding process.

4. A processing method of an image formation device according to claim 3, wherein the image formation method further comprises printing the image data input at the input unit with the image formation device, and wherein the image data is transmitted to the other image formation device selected in the selecting step when the image data cannot be printed by the image formation device.

5. A non-transitory computer-readable storage medium having stored thereon a program for controlling an image formation device having a storage unit capable of storing image data to execute processing steps according to the processing method of claim 3.

6. An image formation device according to claim 1, wherein the control unit performs a changing process for changing a page sequence of the image data for transmission.

7. A processing method of an image formation device according claim 3, wherein the specified process on the image data comprises performing a changing process for changing a page sequence of the image data.

8. An image formation device according to claim 1, wherein each of the image formation device and the other image formation device selected by the selecting unit comprises a multi-functional apparatus including a scanning function and a printing function.

* * * * *